United States Patent
Kang et al.

(10) Patent No.: US 9,237,345 B2
(45) Date of Patent: Jan. 12, 2016

(54) NEIGHBOR BLOCK-BASED DISPARITY VECTOR DERIVATION IN 3D-AVC

(71) Applicant: QUALCOMM Incorporated, San Diego, CA (US)

(72) Inventors: Jewon Kang, Seoul (KR); Ying Chen, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 14/189,177

(22) Filed: Feb. 25, 2014

(65) Prior Publication Data

US 2014/0240456 A1  Aug. 28, 2014

Related U.S. Application Data

(60) Provisional application No. 61/769,716, filed on Feb. 26, 2013, provisional application No. 61/770,263, filed on Feb. 27, 2013, provisional application No. 61/772,321, filed on Mar. 4, 2013, provisional application No. 61/803,384, filed on Mar. 19, 2013, provisional application No. 61/815,656, filed on Apr. 24, 2013.

(51) Int. Cl.
| | |
|---|---|
| *H04N 7/18* | (2006.01) |
| *H04N 19/597* | (2014.01) |
| *H04N 19/56* | (2014.01) |
| *H04N 19/52* | (2014.01) |
| *H04N 19/513* | (2014.01) |
| *H04N 19/577* | (2014.01) |

(52) U.S. Cl.
CPC ....... *H04N 19/00769* (2013.01); *H04N 19/513* (2014.11); *H04N 19/52* (2014.11); *H04N 19/56* (2014.11); *H04N 19/577* (2014.11); *H04N 19/597* (2014.11)

(58) Field of Classification Search
CPC ............. H04N 19/0003; H04N 19/00218; H04N 19/00684; H04N 19/00696
USPC ............. 375/240.16, 240.17, 240.25, 240.26; 348/42–60
See application file for complete search history.

(56) References Cited

U.S. PATENT DOCUMENTS

| | | | |
|---|---|---|---|
| 2014/0241430 A1 | 8/2014 | Zhang et al. | |
| 2014/0241431 A1 | 8/2014 | Zhang et al. | |
| 2014/0267605 A1 | 9/2014 | Thirumalai et al. | |
| 2014/0314147 A1* | 10/2014 | Rusanovskyy | H04N 19/517 375/240.12 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.

(Continued)

*Primary Examiner* — Andy Rao
(74) *Attorney, Agent, or Firm* — Shumaker & Sieffert, P.A.

(57) ABSTRACT

Techniques are described for deriving a disparity vector for a current block based on a disparity motion vector of a neighboring block in a 3D-AVC video coding process. The disparity vector derivation allows for texture-first coding where a depth view component of a dependent view is coded subsequent to the coding of the corresponding texture component of the dependent view.

30 Claims, 11 Drawing Sheets

(56) References Cited

OTHER PUBLICATIONS

Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27,-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
International Search Report and Written Opinion from Application No. PCT/US2014/018679, dated May 20, 2014, 13 pp.
International Preliminary Report on Patentability from International Application No. PCT/US2014/018679, dated Feb. 13, 2015, 11 pp.
Chang, et al., "3D-CE5.h related: Depth-oriented Neighboring Block Disparity Vector (DoNBDV) with virtual depth", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16); URL: http://phenix.int-evry.fr/jct, No. JCT3V-B0090, XP030130271, 5 pp.
Co-pending U.S. Appl. No. 14/215,876, filed Mar. 17, 2014.
Kang, et al., "3D-CE2.h related: Enhanced disparity vector derivation", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16); URL: http://phenix.int-evry.fr/jct/,, No. JCT3V-C0050, XP030130466, 4 pp.
Lee, et al., "3D-CE2.h Related Results on Disparity Vector Derivation", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16); URL: http://phenix.int-evry.fr/jct2/ No. JCT3V-00097, XP030130513, 3 pp.
Tech, et al., "3D-HEVC Test Model 2," Joint Collaborative Team on 3D Video Coding Extension Development of ITU-T SG 16 WP 3 and ISO/IEC JTC 1/SC 29/WG 11, Document: JCT3V- B1005_d0, 2nd Meeting: Shanghai, CN, Oct. 13-19, 2012, XP030130414, 118 pp.
Zhang, et al., "3D-CE5.h related: Disparity vector derivation for multiview video and 3DV", MPEG Meeting; Apr. 30,-May 5, 2012; Geneva; (Motion Picture Expert Group or ISO/IEC JTC1/SC29/WG11), No. m24937, XP030053280, 6 pp.
Zheng, et al., "Disparity Estimation With Hierarchical Block Correlation for Stereoscopic Image Coding ", Systems & Computers in Japan, Wiley, Hoboken, NJ, US, vol. 28, No. 6, Jun. 15, 1997 XP000723851, 8 pp.
Hannuksela, et al., "3D-AVC Draft Text 5," ITU-T SG 16 WP 3 and ISO/IEC JTC 1/SC 29/WG 11, Jan. 17-23, 2013, Document: JCT3V-C1002, 82 pp.
Tech, et al., "JCT-3V AHG report: MV-HEVC/3D-HEVC Test Model editing (AHG3)," ITU-T SG 16 WP 3 and ISO/IEC JTC 1/SC 29/WG 11, Oct. 13-19, 2012, Document: JCT3V-B0003, 4 pp.
Kang, et al., "3D-CE5.h related: Improvements for disparity vector derivation," ITU-T SG 16 WP 3 and ISO/IEC JTC 1/SC 29/WG 11, Oct. 13-19, 2012, Document: JCT3V-B0047, 4 pp.
Su, et al., "3DV-CE1.a: Block-based View Synthesis Prediction for 3DV-ATM," ITU-T SG 16 WP 3 and ISO/IEC JTC 1/SC 29/WG 11, Document: JCT2-A0107, Jul. 16-20, 2012, 5 pp.
Sung, et al., "3D-CE5.h: Simplification of disparity vector derivation for HEVC-based 3D video coding," ITU-T SG 16 WP 3 and ISO/IEC JTC 1/SC 29/WG 11, Document: JCT2-A0126, Jul. 16-20, 2012, 4 pp.
Tech, et al., "3D-HEVC Test Model 1," ITU-T SG 16 WP 3 and ISO/IEC JTC 1/SC 29/WG 11, Jul. 16-20, 2012, Document: JCT3V-A1005_d0, 83 pp.
Chang, et al., "CE1.h: Depth-Oriented Neighboring Block Disparity Vector (DoNBDV) with Virtual Depth Retrieval," Media Tek Inc., JCT3V-00131, 3rd Meeting: Geneva, CH, Jan. 17-23, 2013, XP030056435, 5 pp.
Rusanovskyy, et al., "CE1.a-related: Simplification of BVSP in 3DV-ATM," Nokia Corporation, 3rd Meeting: Geneva, CH, URL:http://phenix.int-evry.fr/jct/,, No. JCT3V-C0169, Jan. 17-23, 2013, XP030130585, 2 pp.
Zhang et al., "CE5.h: Disparity vector generation results," Joint Collaborative Team on 3D Video Coding Extension Development of ITU-T SG 16 WP 3 and ISO/IEC JTC 1/SC 29/WG 11, Document: JCT3V-A0097, Jul. 16-20, 2012, 5 pp.

* cited by examiner

Co-located MB

Co-located MB

Co-located MB

Co-located MB

Co-located MB

Co-located MB

Co-located MB

Co-located MB

NEIGHBOR BLOCK-BASED DISPARITY VECTOR DERIVATION IN 3D-AVC

This application claims the benefit of:
U.S. Provisional Application No. 61/769,716, filed Feb. 26, 2013,
U.S. Provisional Application No. 61/770,263, filed Feb. 27, 2013,
U.S. Provisional Application No. 61/772,321, filed Mar. 4, 2013,
U.S. Provisional Application No. 61/803,384, filed Mar. 19, 2013, and
U.S. Provisional Application No. 61/815,656, filed Apr. 24, 2013, the contents of each of which are incorporated herein in their entirety.

TECHNICAL FIELD

This disclosure relates to video coding and, more particularly, to techniques for deriving disparity vectors.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes disparity vector derivation for blocks of a texture view component for 3D-Advanced Video Coding (3D-AVC) compliant video coding process without needing a corresponding depth view component. The disparity vector derivation techniques evaluate the motion information of neighboring block to identify a neighboring block that is inter-view predicted with a disparity motion vector, and utilize the disparity motion vector to derive the disparity vector. By not relying on the corresponding depth view component for disparity vector derivation, the techniques allow for texture-first coding in 3D-AVC resulting in compatibility with other video coding techniques, bandwidth efficiency, and reduction in coding complexity.

In one example, the disclosure describes a method of decoding video data for 3D-Advanced Video Coding (3D-AVC) comprising receiving a coded bitstream in a 3D-AVC compliant video coding process generated with texture-first coding of dependent views, decoding a texture view component of a dependent view of the dependent views in the 3D-AVC compliant video coding process, wherein decoding the texture view component comprises selecting a first temporal picture, wherein the first temporal picture comprises a picture identified at a first entry of a first reference picture list, selecting a second temporal picture, wherein the second temporal picture comprises a picture identified at a first entry of a second reference picture list, evaluating motion information of one or more neighboring blocks of a current macroblock in the texture view component to determine whether at least one neighboring block is inter-view predicted with a disparity motion vector that refers to an inter-view reference picture in a view other than the dependent view, wherein the one or more neighboring blocks comprise spatial neighboring blocks and at least one temporal neighboring block in at least one of the first selected temporal picture or the second selected temporal picture, deriving a disparity vector for the current block based on the disparity motion vector for one of the evaluated neighboring blocks, and assigning the derived disparity vector to each block within the macroblock, and decoding a depth view component that corresponds to the texture view component subsequent to decoding the texture view component.

In one example, the disclosure describes a method of encoding video data for 3D-Advanced Video Coding (3D-AVC) comprising encoding a texture view component of a dependent view in a 3D-AVC compliant video coding process, wherein encoding the texture view component comprises selecting a first temporal picture, wherein the first temporal picture comprises a picture identified at a first entry of a first reference picture list, selecting a second temporal picture, wherein the second temporal picture comprises a picture identified at a first entry of a second reference picture list, evaluating motion information of one or more neighboring blocks of a current macroblock in the texture view component to determine whether at least one neighboring block is inter-view predicted with a disparity motion vector that refers to an inter-view reference picture in a view other than the dependent view, wherein the one or more neighboring blocks comprise spatial neighboring blocks and at least one temporal neighboring block in at least one of the first selected temporal picture or the second selected temporal picture, deriving a disparity vector for the current block based on the disparity motion vector for one of the evaluated neighboring blocks, and assigning the derived disparity vector to each block within the macroblock, encoding a depth view component that corresponds to the texture view component subsequent to encoding the texture view component, and generating for output a coded bitstream with texture-first coding of dependent views that includes the encoded texture view component and the encoded depth view component.

In one example, the disclosure describes a device for coding video data for 3D-Advanced Video Coding (3D-AVC) comprising a memory configured to store video data, and a video coder, the video coder comprising one or more processors and configured to code, in a 3D-AVC compliant video coding process, a texture view component of a dependent view of the video data, wherein, to code the texture view component, the video coder is configured to evaluate motion information of only one or more neighboring blocks, of a current macroblock block in the texture view component, with motion vectors that refer to a first reference picture list of two reference picture lists and avoid evaluating motion information of neighboring blocks with motion vectors that refer to a second reference picture list of the two reference picture lists to determine whether at least one neighboring block is inter-view predicted with a disparity motion vector that refers to an inter-view reference picture in a view other than the dependent view, and derive a disparity vector for the current block based on the disparity motion vector for one of the evaluated neighboring blocks, assign the derived disparity vector to each block within the macroblock, and code a depth view component, of the video data, that corresponds to the texture view component subsequent to coding the texture view component.

In one example, the disclosure describes a computer-readable storage medium having instructions stored thereon that when executed cause one or more processors of a video coder of a device for coding video data for 3D-Advanced Video Coding (3D-AVC) to code a texture view component of a dependent view of the dependent views in the 3D-AVC compliant video coding process, wherein the instructions that cause the one or more processors to code the texture view component comprise instructions that cause the one or more processors to evaluate motion information of only one or more neighboring blocks, of a current macroblock block in the texture view component, with motion vectors that refer to a first reference picture list of two reference picture lists and avoid evaluating motion information of neighboring blocks with motion vectors that refer to a second reference picture list of the two reference picture lists to determine whether at least one neighboring block is inter-view predicted with a disparity motion vector that refers to an inter-view reference picture in a view other than the dependent view, and derive a disparity vector for the current block based on the disparity motion vector for one of the evaluated neighboring blocks, assign the derived disparity vector to each block within the macroblock, and code a depth view component that corresponds to the texture view component subsequent to coding the texture view component.

The details of one or more examples are set forth in the accompanying drawings and the description below. Other features, objects, and advantages will be apparent from the description and drawings, and from the claims.

DETAILED DESCRIPTION

Figure 1:
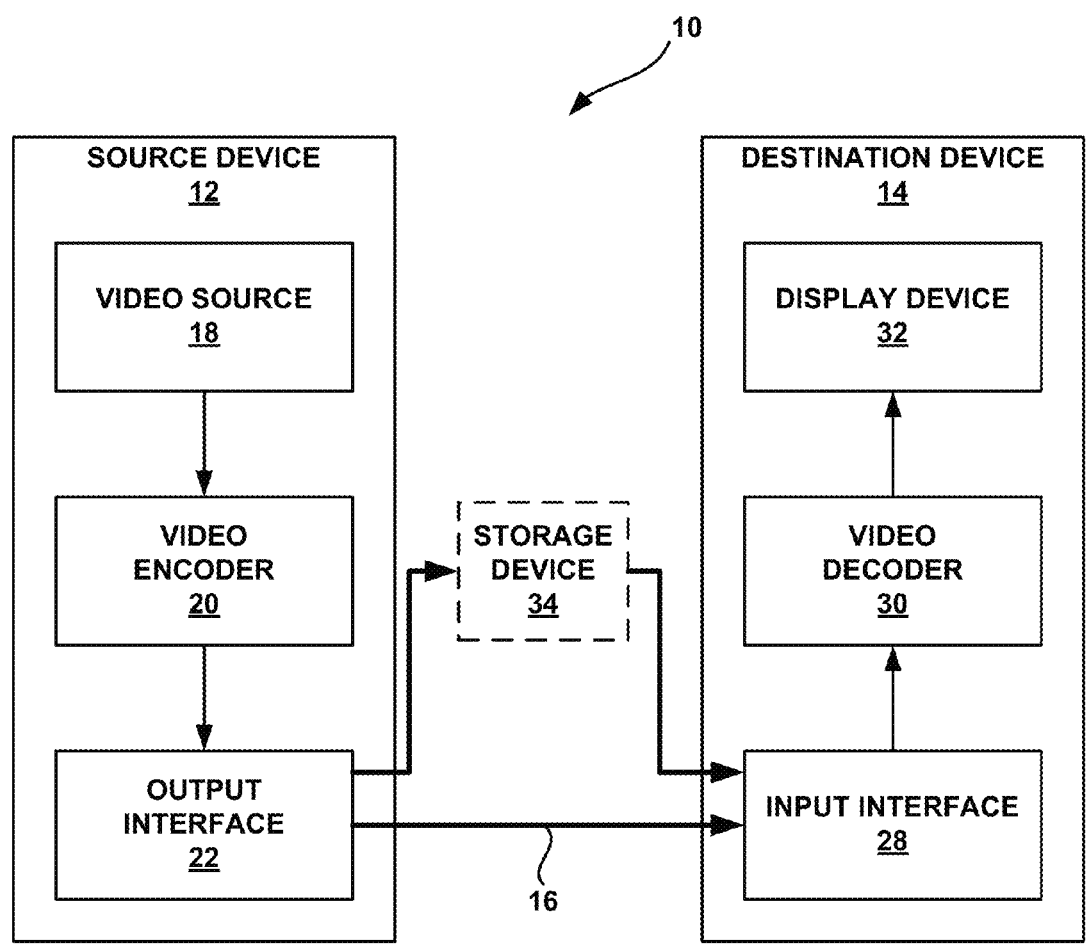
FIG. 1 is a block diagram illustrating an example video encoding and decoding system that may utilize the techniques described in this disclosure.

This disclosure is related to multiview video coding based on advanced codecs, including the coding of two or more views with the 3D-Advanced Video Coding (AVC) codec. More specifically, techniques related to the disparity vector generation are proposed. In 3D-AVC, a view component includes a texture view component and a depth view component, where the texture view component includes the video data (i.e., a picture) and the corresponding depth view component indicates relative depth of the objects in the texture view component. The disparity vector is a vector of a block in the texture view component that indicates the location of a corresponding block in a texture view component of another view.

Some techniques for disparity vector generation in 3D-AVC rely on the depth view component (also referred to as a depth map) to generate a disparity vector for a block in the texture view component. There may be certain issues with needing to rely on the depth view component to generate a disparity vector. Because the depth view component is needed for disparity vector generation, for non-base views, a video coder (e.g., video encoder or video decoder) needs to code (e.g., encode or decode) the depth view component first before coding (e.g., encoding or decoding) the corresponding texture view component (referred to as a depth-first coding). However, a client of the 3D-AVC based video service may only require the texture view components (i.e., decoding of the texture views), but it may be impossible for a media gateway to skip forwarding the depth view components (e.g., depth packets) or for a video decoder to avoid unnecessarily decoding the depth view components. Accordingly, these other techniques significantly increase both bandwidth and decoding complexity.

Moreover, some other video coding standards allow for texture-first coding, in which the texture view component is coded before the depth view component, such as in the multiview video coding (MVC) plus depth (D), or MVC+D, video coding standard and the 3D-High Efficiency Video Coding (3D-HEVC) video coding standard in development. Some other video coding standards do not even rely on depth, such as the MVC extension of H.264/AVC. With depth-first coding order, multi-view compatibility may not be possible because there is no capability of texture only extraction. Also, texture-first coding order is commonly used for MVC coding standards, and the commonality in the design may provide ease of implementation. However, with depth-first coding, such commonality in design may not be possible. In other words, depth-first coding may be considered as an inconsistent design element.

Furthermore, because a depth view component is decoded prior to corresponding texture view component, in depth-first coding, there is a delay in when the texture view component is decoded. This delay may be generally undesirable, but especially if the texture view component is random access point of view and there is decoding latency in the random access point of view.

Some techniques have been used where texture-first coding is implemented for 3D-AVC. In these other techniques, disparity vector derivation is excluded (i.e., there is an absence of the disparity vector derivation). These other techniques resulted in poor coding performance for the 3D-AVC codec, as compared to 3D-AVC codec with depth-first coding and disparity vector derivation, and close to MVC+D codec. In other words, the absence of the disparity vector derivation method incurs significant inefficient coding costs for texture coding tools.

The techniques described in this disclosure allow for texture-first coding resulting in ease of implementation with other video coding techniques while deriving a disparity vector. In particular, the techniques described in this disclosure derive the disparity vector for a macroblock without relying on the corresponding depth view component (e.g., depth map). For example, a video coder (e.g., a video encoder or a video decoder) evaluates (i.e., checks) the motion vector information of macroblocks neighboring the current macroblock. The motion vector of neighboring block refers to a picture in a view other the view that includes the current macroblock, the video coder converts such a motion vector of the evaluated neighboring block to a disparity vector for the current macroblock (i.e., utilizes the motion vector of the neighboring block as a disparity vector for the current macroblock). In this manner, the video coder does not need to rely on the depth view component to determine the disparity vector for a macroblock in the texture view component.

In this disclosure, a motion vector that refers to a picture in a view other than the view that includes the current macroblock is referred to as a disparity motion vector. In other words, a disparity motion vector is a vector that refers to a block in an inter-view reference picture (i.e., a picture in a view other than the view that includes the current macroblock). In the techniques described in this disclosure, if the video coder determines that an evaluated neighboring block is inter-predicted with a disparity motion vector, the video coder converts the disparity motion vector of the neighboring macroblock into a disparity vector for the current block.

The disparity motion vector and the disparity vector should not be confused. The disparity motion vector refers to a macroblock in an inter-view reference picture used for compensation (i.e., a residual between the current block and the macroblock referred to by the disparity motion vector is determined and used to reconstruct the current block as part of motion or disparity compensation). A disparity vector is a vector that indicates disparity between the current block and a corresponding block to which the disparity vector refers. The disparity vector is then used for various purposes such as a view synthesis, motion vector prediction, and various other coding tools. In some cases, it may be possible that the block referred to by the disparity vector is used for compensation. In such cases, the disparity vector is considered to also be a disparity motion vector. In other words, the disparity vector and the disparity motion vector are different vectors except in the cases where the macroblock referred to by the disparity vector just happens to also be used for compensation, in which case, the disparity vector and disparity motion vector become the same.

The disparity motion vector and a temporal motion vector should not be confused. In non-multiview video coding, a motion vector refers to a block in a different picture; however, because there is only one view, this block in a different picture is in the same view as the current macroblock being inter-predicted. Such a motion vector is referred to as a temporal motion vector or normal motion vector in this disclosure to avoid confusion. A disparity motion vector, on the other hand, is used in multiview video coding techniques, such as 3D-AVC, where the motion vector refers to a reference picture in another view.

For instance, in the context of multiview video coding, there are two kinds of motion vectors. One is normal motion vector pointing to temporal reference pictures and the corresponding inter prediction is motion-compensated prediction (MCP). The other is disparity motion vector pointing to pictures in a different view and the corresponding inter prediction is disparity-compensated prediction (DCP). A normal motion vector that is not a disparity motion vector is also referred to as a temporal motion vector in this disclosure.

Also, inter-prediction in the case where the reference picture is another view is referred to as inter-view prediction. A reference picture in a view other than the view that includes the current macroblock is referred to as an inter-view reference picture, and a reference picture in the same view is referred to as a temporal reference picture. Moreover, one access unit includes video data for decoding pictures from different views that are to be displayed at substantially a same time, and a disparity motion vector may only refer to inter-view reference pictures in the same access unit as the access unit that includes the video data for the current macroblock. A temporal motion vector, however, refers to a temporal reference picture in another access unit, but for the same view.

In other words, in multiview video coding, inter-view prediction is performed among pictures captured in the different views of the same access unit (i.e., with the same time instance) to remove correlation between views. A picture coded with inter-view prediction may be added into a reference picture list for the inter-view prediction of the other non-base views. An inter-view prediction reference picture can be put in any position of a reference picture list in the same way with an inter prediction reference picture.

As described in more detail, a video coder (e.g., a video encoder or a video decoder) may evaluate motion information of one or more neighboring blocks of a current macroblock to determine whether a neighboring block is inter-predicted with a disparity motion vector that refers to an inter-view reference picture. In some examples, the video coder may only evaluate motion information of motion vectors of neighboring blocks that refer to picture in a first reference picture list (RefPicList0), and avoid evaluating motion information of motion vectors of neighboring blocks that refer to picture in a second reference picture list (RefPicList1). For example, a first neighboring block may have a disparity motion vector (e.g., inter-predicted with a disparity motion vector); however, this disparity motion vector may refer to an inter-view reference picture in RefPicList1. In this example, the video coder may avoid evaluating (e.g., checking) the disparity motion vector for this first neighboring block (i.e., the disparity motion vector for this first neighboring block will not be the disparity vector for the current block), and proceed with another neighboring block. In this way, the techniques may reduce the amount of motion information that needs to accessed, thereby reducing the amount of time it takes to code the current macroblock.

The blocks that neighbor the current macroblock include spatial neighboring blocks (e.g., blocks in the same picture as the current macroblock) and temporal neighboring blocks (e.g., blocks in a different picture that the picture that includes the current macroblock). The pictures that include temporal neighboring blocks are referred to as temporal pictures.

There may be large number of candidate temporal pictures (e.g., any previously coded picture stored in a decoded picture buffer). However, the techniques described in this disclosure may limit the number of candidate temporal pictures, in some examples. For instance, the techniques may limit the number of candidate temporal pictures that include temporal neighboring blocks to two temporal pictures.

As one example, the video coder may select a first temporal picture, where the first temporal picture is a picture identified at a first entry of a first reference picture list (e.g., entry 0 of RefPicList0), and select a second temporal picture, where the second temporal picture is a picture identified at a first entry of a second reference picture list (e.g., entry 0 of RefPicList1). Selecting the pictures identified in the first entries of the two reference picture lists may exploit the mechanism in which the reference picture lists are constructed to utilize temporal pictures that are likely to yield temporal neighboring blocks that are inter-predicted with a disparity motion vector (and in some examples, disparity motion vectors that refer to RefPicList0).

In some examples, the video coder may partition the current macroblock into a plurality of blocks (e.g., partitions or sub-blocks). As described above, the video coder may derive a disparity vector for the current macroblock based on a disparity motion vector for one of the evaluated neighboring blocks. In some examples, the video coder may assign this derived disparity vector to each of the blocks within the current macroblock. In this way, the video coder may minimize the amount of disparity vector it needs to derive, and can derive one for the macroblock and assign that same one to all blocks of the macroblock (i.e., the blocks of the macroblock adopt the disparity vector derived for the macroblock as their own respective disparity vectors).

FIG. 1 is a block diagram illustrating an example video encoding and decoding system in accordance with one or more examples described in this disclosure. For example, system 10 includes source device 12 and destination device 14. Source device 12 and destination device 14 are configured to implement multiview video coding in which source device 12 and destination device 14 each code pictures of different views. When the pictures of the different views are viewed at substantially a same time, the viewer perceives an image that encompasses a 3D volume, instead of an image that is constrained to the 2D area of the display.

System 10 may operate in accordance with different video coding standards, a proprietary standard, or any other way of multiview coding. The following describes a few examples of video coding standards, and should not be considered limiting. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010, the entire content of which is incorporated herein by reference. Another joint draft of the MVC is described in "Advanced video coding for generic audiovisual services," ITU-T Recommendation H.264, June 2011, the entire content of which is incorporated herein by reference. Some additional video coding standards include the MVC+D and 3D-AVC.

For purposes of illustration only, the techniques described in this disclosure are described with examples in accordance with the H.264 standard, such as the 3D-AVC. However, the techniques described in this disclosure should not be considered limited to these example standards, and may be extendable to other video coding standards for multiview coding or 3D video coding (e.g., 3D-HEVC), or to techniques related to multiview coding or 3D video coding that are not necessarily based on a particular video coding standard. For example, the techniques described in this disclosure are implemented by video encoders/decoders (codecs) for multiview coding, where multiview coding includes coding of two or more views.

As shown in FIG. 1, system 10 includes a source device 12 that generates encoded video data to be decoded at a later time by a destination device 14. Source device 12 and destination device 14 comprise any of a wide range of devices, including a wireless handset such as so-called "smart" phones, so-called "smart" pads, or other such wireless devices equipped for wireless communication. Additional examples of source device 12 and destination device 14 include, but are not limited to, a digital television, a device in digital direct broadcast system, a device in wireless broadcast system, a personal digital assistants (PDA), a laptop computer, a desktop computer, a tablet computer, an e-book reader, a digital camera, a digital recording device, a digital media player, a video gaming device, a video game console, a cellular radio telephone, a satellite radio telephone, a video teleconferencing device, and a video streaming device, or the like.

Destination device 14 may receive the encoded video data to be decoded via a link 16. Link 16 comprises any type of medium or device capable of moving the encoded video data from source device 12 to destination device 14. In one example, link 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data is output from output interface 22 to a storage device 34. Similarly, encoded data is accessed from storage device 34 by input interface 28. Examples of storage device 34 include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 corresponds to a file server or another intermediate storage device that holds the encoded video generated by source device 12. In these examples, destination device 14 accesses stored video data from storage device 34 via streaming or download. The file server is any type of server capable of storing encoded video data and transmitting that encoded video data to the destination device

14. Example file servers include a web server (e.g., for a website), an FTP server, network attached storage (NAS) devices, or a local disk drive. Destination device 14 accesses the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions (e.g., via the Internet), encoding of digital video for storage on a data storage medium, decoding of digital video stored on a data storage medium, or other applications. In some examples, system 10 is configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 includes a modulator/demodulator (modem) and/or a transmitter. In source device 12, video source 18 includes one or more of a source such as a video capture device (e.g., a video camera), a video archive containing previously captured video, a video feed interface to receive video from a video content provider, and/or a computer graphics system for generating computer graphics data as the source video, a combination of such sources, or any other source. As one example, if video source 18 is a video camera, source device 12 and destination device 14 may form so-called camera phones or video phones. However, the techniques described in this disclosure are applicable to video coding in general, and may be applied to wireless and/or wired applications.

Video encoder 20 encodes the captured, pre-captured, or computer-generated video. Output interface 22 of source device 12 is configured to transmit the encoded video data to destination device 14. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 includes a receiver and/or a modem. Input interface 28 of destination device 14 receives the encoded video data over link 16 or from storage device 34. The encoded video data communicated over link 16, or provided on storage device 34, includes a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 includes an integrated display device and also configured to interface with an external display device. In other examples, destination device 14 is a display device. In general, display device 32 displays the decoded video data to a user, and comprises any of a variety of display devices such as a liquid crystal display (LCD), a plasma display, an organic light emitting diode (OLED) display, or another type of display device.

Video encoder 20 and video decoder 30 may operate according to various video coding standards, such as the examples listed above. However, the techniques described in this disclosure should not be considered limited as such. For purposes of description, video encoder 20 and video decoder 30 are described in context of the H.264 standard, such as the 3D-AVC standard. The techniques of this disclosure, however, are not limited to any particular coding standard. Other examples of video compression standards include MPEG-2 and ITU-T H.263, and include the 3D-HEVC. Proprietary coding techniques, such as those referred to as On2 VP6/VP7/VP8, may also implement one or more of the techniques described herein.

Although not shown in FIG. 1, in some aspects, video encoder 20 and video decoder 30 are each integrated with an audio encoder and decoder, and include appropriate MUX-DEMUX units, or other hardware and software, to handle encoding of both audio and video in a common data stream or separate data streams. If applicable, in some examples, MUX-DEMUX units conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. For example, the techniques described in this disclosure may be described from the perspective of an apparatus or a device. As one example, the apparatus or device may include video decoder 30 (e.g., destination device 14 as part of a wireless communication device), and video decoder 30 may include one or more processors configured to implement techniques described in this disclosure (e.g., decode video data in accordance with techniques described in this disclosure). As another example, the apparatus or device may include a micro-processor or an integrated circuit (IC) that includes video decoder 30, and the micro-processor or IC may be part of destination device 14 or another type of device. The same may apply for video encoder 20 (i.e., an apparatus or device like source device 12 and/or a micro-controller or IC includes video encoder 20, where video encoder 20 is configured to encode video data in accordance with techniques described in this disclosure).

When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

A video sequence typically includes a series of video pictures from a view. A group of pictures (GOP) generally comprises a series of one or more video pictures. A GOP may include syntax data in a header of the GOP, a header of one or more pictures of the GOP, or elsewhere, that describes a number of pictures included in the GOP. Each picture may include picture syntax data that describes an encoding mode for the respective picture. Video encoder 20 typically operates on video blocks within individual video pictures in order to encode the video data. A video block may correspond to a macroblock, a partition of a macroblock, and possibly a subblock of a partition, as defined in the H.264 standard. The video blocks may have fixed or varying sizes, and may differ in size according to a specified coding standard. Each video picture may include a plurality of slices. Each slice may include a plurality of blocks.

As an example, the ITU-T H.264 standard supports intra-prediction in various block sizes, such as 16 by 16, 8 by 8, or 4 by 4 for luma components, and 8×8 for chroma components, as well as inter-prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions (e.g., 16×16 pixels or 16 by 16 pixels). In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

When the block is intra-mode encoded (e.g., intra-predicted), the block may include data describing an intra-prediction mode for the block. As another example, when the block is inter-mode encoded (e.g., inter-predicted), the block may include information defining a motion vector for the block. This motion vector refers to a reference picture in the same view (e.g., a temporal motion vector), or refers to a reference picture in another view (e.g., a disparity motion vector). The data defining the motion vector for a block describes, for example, a horizontal component of the motion vector, a vertical component of the motion vector, a resolution for the motion vector (e.g., one-quarter pixel precision or one-eighth pixel precision). In addition, when inter-predicted, the block may include reference index information such as a reference picture to which the motion vector points, and/or a reference picture list (e.g., RefPicList0 or RefPicList1) for the motion vector.

In the H.264 standard, following intra-predictive or inter-predictive coding, video encoder 20 calculates residual data for the macroblocks. The residual data may correspond to pixel differences between pixels of the unencoded picture and prediction values for the macroblock in H.264.

Following any transforms to produce transform coefficients, video encoder 20 performs quantization of the transform coefficients, in some examples. Quantization generally refers to a process in which transform coefficients are quantized to possibly reduce the amount of data used to represent the coefficients, providing further compression. The quantization process reduces the bit depth associated with some or all of the coefficients. For example, an n-bit value is rounded down to an m-bit value during quantization, where n is greater than m.

In some examples, video encoder 20 utilizes a predefined scan order to scan the quantized transform coefficients to produce a serialized vector that can be entropy encoded. In other examples, video encoder 20 performs an adaptive scan. After scanning the quantized transform coefficients to form a one-dimensional vector, in some examples, video encoder 20 entropy encodes the one-dimensional vector according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology, as a few examples. Video encoder 20 also entropy encodes syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video decoder 30 implements the inverse of the techniques of video encoder 20. For example, video decoder 30 decodes the encoded video bitstream and determines the residual blocks by inverse quantization and inverse transform. Video decoder 30 sums the residual blocks with blocks of previously decoded pictures to determine the pixel values for the blocks within the picture.

As described above, the techniques described in this disclosure are directed to the 3D-AVC. To better understand the techniques, the following describes some basic H.264/AVC coding techniques, multiview video coding from the perspective of H.264/MVC extension and the High Efficiency Video Coding (HEVC) standard, and 3D-AVC techniques. After such description, the disclosure describes techniques for deriving a disparity vector, and in particular, deriving a disparity vector for 3D-AVC without needing to rely on a depth view component (e.g., a depth map).

For H.264/Advance Video Coding (AVC), video encoding or decoding (e.g., coding) is implemented on macroblocks, where a macroblock represents a portion of a frame which are inter-predicted or intra-predicted (i.e., inter-prediction encoded or decoded or intra-prediction encoded or decoded). For instance, in H.264/AVC, each inter Macroblock (MB) (e.g., inter-predicted macroblock) may be partitioned into four different ways: one 16×16 MB partition, two 16×8 MB partitions, two 8×16 MB partitions, or four 8×8 MB partitions. Different MB partitions in one MB may have different reference index values for each direction (i.e., RefPicList0 or RefPicList1). When a MB is not partitioned into four 8×8 MB partitions, it has only one motion vector for the whole MB partition in each direction.

As part of video coding (encoding or decoding), video encoder 20 and video decoder 30 are configured to construct one or two reference picture lists, referred to as RefPicList0 and RefPicList1. The reference picture list(s) identify reference pictures that can be used to inter-predict macroblocks of a frame or a slice. For instance, video encoder 20 may signal a reference index and a reference picture list identifier. Video decoder 30 may receive the reference index and the reference picture list identifier and determine the reference picture that is to be used for inter-prediction decoding the current macroblock from the reference index and the reference picture list identifier.

When a MB is partitioned into four 8×8 MB partitions, each 8×8 MB partition can be further partitioned into sub-blocks. There are four different ways to get sub-blocks from an 8×8 MB partition: one 8×8 sub-block, two 8×4 sub-blocks, two 4×8 sub-blocks, or four 4×4 sub-blocks. Each sub-block can have a different motion vector in each direction. The manner in which an 8×8 MB partition is partitioned into sub-blocks is named sub-block partition.

For multiview video coding there are multiple different video coding standards. To avoid confusion, when this disclosure describes multiview video coding generically, this disclosure uses the phrase "multiview video coding." In general, in multiview video coding, there is a base view and one or more enhancement or dependent views. The base view is fully decodable without reference to any of the dependent views (i.e., the base view is only inter-predicted with temporal motion vectors). This allows a codec that is not configured for multiview video coding to still receive at least one view that is fully decodable (i.e., the base view can be extracted out and the other views discarded, allowing a decoder not configured for multiview video coding to still decode the video content albeit without 3D experience). The one or more enhancement or dependent views may be inter-predicted with respect to the base view or with respect to other enhancement or dependent view or with respect to other pictures in the same view (i.e., disparity compensation predicted or motion compensated predicted).

Whereas "multiview video coding" is used generically, the acronym MVC is associated with an extension of H.264/AVC. Accordingly, when the disclosure uses the acronym MVC, the disclosure is referring specifically to the extension to H.264/AVC video coding standard. The MVC extension of H.264/AVC relies upon disparity motion vectors as another type of motion vector in addition to temporal motion vectors. Another video coding standard, referred to as MVC+D, has also been developed by JCT-3V and MPEG. MVC+D applies the same low-level coding tools as those of MVC for both texture and depth and the decoding of depth is independent to the decoding of texture and vice-versa. For instance, in MVC, a frame is represented only by one view component, referred to as a texture view component, or simply texture. In MVC+D, there are two view components: texture view component and depth view component, or simply texture and depth. For example, in MVC+D, each view includes a texture view and a depth view, where the view includes a plurality of view components, the texture view includes a plurality of texture view components, and the depth view includes a plurality of depth view components.

Each texture view component is associated with a depth view component to form a view component of a view. The depth view component represents relative depth of the objects in the texture view component. In MVC+D, the depth view component and the texture view component are separately decodable. For example, video decoder 30 may implement two instances of an MVC codec, in which a first codec decodes the texture view components and a second coded decodes the depth view components. These two codecs can execute independent of one another because the texture view components and the depth view components are separately encoded.

In MVC+D, a depth view component is always immediately following the associated (e.g., corresponding) texture view component. In this manner, MVC+D supports texture-first coding, where the texture view component is decoded prior to the depth view component.

A texture view component and its associated (e.g., corresponding) depth view component may include the same picture order count (POC) value and view_id (i.e., the POC value and view_id of a texture view component and its associated depth view component is the same). The POC value indicates the display order of the texture view component and the view_id indicates the view to which the texture view component and depth view component belong.

The following additional description for 3D-Advance Video Coding (AVC). Recent standardization activities in MPEG include the Call for Proposal (CfP) for 3D video technologies, and there are several techniques selected among the responses in the current reference software. AVC based 3D video (3D-AVC) coding standard is currently under development by JCT-3V, and the latest version of 3D-AVC is now available in public and incorporated herein by reference in its entirety: M. M. Hannuksela, Y. Chen, T. Suzuki, J.-R. Ohm, G. J. Sullivan, "3D-AVC draft text 5," JCT3V-C1002, Geneva, CH, January, 2013. It is available, as of Feb. 25, 2014, from the following link: http://phenix.it-sudparis.eu/jct2/doc_end_user/documents/3_Geneva/wg11/JCT3V-C1002-v3.zip.

3D-AVC is compatible to H.264/AVC in a way that the texture part of the base view is fully decodable for H.264/AVC decoder. For example, the texture view components in view components of the base view may only be inter-predicted with other texture view components in the same base view. The texture view components in the base view may not inter-view predicted. Also, the texture view component in the base view may not require the corresponding depth view component for decoding purposes.

For enhanced view components in 3D-AVC, in some other example techniques, the depth may be coded prior to the texture and a texture view component may be coded based on the information from the depth view component, which is also known as a depth-first coding. However, each texture view component is coded before the respective depth view components in texture-first coding order, such as in MVC+D described above. In other words, in some other example techniques, in 3D-AVC, the texture view component of the base view is coded first, followed by the associated depth view component of the base view, followed by the depth view component of a first enhancement or dependent view, followed by the associated texture view component of the first enhancement or dependent view, followed by the depth view component of a second enhancement or dependent view, followed by the associated texture view component of the second enhancement or dependent view, and so forth.

For example, the coding orders of the texture and depth view components in the 3D-AVC are exemplified as follows; wherein T0 and D0, respectively, refer to the texture and depth view components of the base view, and T1 and D1, respectively, refer to the texture and depth view components of the dependent view. T0, D0, D1, T1 . . . , The base view is coded with the texture-first coding order while the dependent view is coded with the depth-first coding order. The hybrid coding order is used in some other example techniques for the 3D-AVC. The base view may have AVC compatibility due to the texture-first coding order while the dependent views do not have such the kind of compatibility since the decoded information of Di is used by Ti (i unequal to 0).

In some examples, even for 3D-AVC, texture first coding of the base views and dependent views may be possible, exemplified in the following coding order: T0, D0, T1, D1 . . . . In this example, all the view components are coded with the texture-first coding order which may provide the AVC/multi-view compatibility.

As described above, in addition to compatibility issues, there may be certain drawbacks with depth-first coding, as compared to texture-first coding. For example, decoding latency in random access point of view, where the decoding of the texture view component is delayed by the decoding of the corresponding depth view component. However, it may be preferable to minimize decoding latency for random access point of view, as a random access point of view picture is a picture that allows for channel switch over.

Furthermore, with depth-first coding, if a video decoder does not need depth and only needs to decode texture views, there may be no practical way to skip the depth packets or allow the video decoder to skip the decoding of the depth views because the depth views are needed to decode the texture views. For instance, a media gateway may not be able to discard the depth views from the coded bitstream since the depth views are need to decode the texture views in depth-first coding. This results in increased bandwidth and increases decoding complexity.

Also, there may be inconsistent design elements. For instance, texture-first coding order is commonly used for multiview video coding, including MVC+D and the HEVC video coding standard, described below. The commonality in the design may provide each of implementation unavailable where depth-first coding is needed.

Some techniques have been proposed to use texture-first coding with 3D-AVC. As one example, 3D-AVC uses the depth view component to derive a disparity vector for a macroblock in the corresponding texture view component, requiring the depth view component to be decoded first. Some techniques have proposed avoiding the derivation of the disparity vector, which assists with texture-first coding. However, the performance of the 3D-AVC codec, in examples where disparity vector derivation is absent, is poor and in line with MVC+D.

As noted above, some example techniques for 3D-AVC use the depth map (e.g., depth view component) to derive the disparity vector for a macroblock in the associated texture view component. How to derive the disparity vector may vary with each low-level coding tool. However, commonly, the depth data of the dependent views is employed for the texture view component coding owing to the depth-first coding order. An in-loop block-based view synthesis inter-view prediction and depth-based motion vector prediction (D-MVP) in the 3D-AVC are the low-level coding tools that use the disparity vector supported from the depth map. In the 3D-AVC software, the results of the conversion process from the actual depth map value to a disparity to a particular view are stored in look-up tables with camera parameters.

In general, the disparity vector may be used to implement one or more coding tools (e.g., video encoder 20 and video decoder 30 may utilize the derived disparity vector for implementing one or more coding tools without using the depth view component for deriving the disparity vector). For example, as described above, the disparity vector may be used as part as inter-view prediction and motion vector prediction (MVP). MVP generically refers to the techniques where the coded bitstream does not include the information for the actual motion vector of a macroblock, but instead includes information from which motion vector can be derived. For instance, in motion vector prediction, the motion vector for the macroblock is predicted from a motion vector predictor such as motion vector of a neighboring block or a motion vector of a block referred to by the motion vector of a neighboring block, as well as a motion vector difference, which is the difference between the actual motion vector and the motion vector predictor. The motion vector predictor may itself by predicted from a set of candidate predictors.

The following describes depth-based motion vector prediction for normal inter-prediction mode. D-MVP refers to a motion vector prediction method incorporating the associated depth map data in the current view which is available due to the depth-first coding order. D-MVP is applied with the texture view components in dependent views.

In 3D-AVC, the D-MVP method is incorporated into the conventional median function-based motion vector prediction in H.264/AVC. Specifically, the type of motion vector to be predicted (i.e., whether temporal motion vector or disparity motion vector) is first identified. For example, in the D-MVP method, a video coder (e.g., video encoder 20 or video decoder 30) may check the reference indices of the motion vectors in the neighboring blocks to determine whether the reference pictures used to inter-predict the neighboring blocks are reference pictures in the same view as the current macroblock or a different view. If the reference picture is in the same view, then the neighboring block is inter-predicted with a temporal motion vector, and if the reference picture is in a different view, then the neighboring block is inter-predicted with a disparity motion vector (i.e., inter-view predicted).

The neighboring blocks include in order of left block, above block, above-right block and above-left block of the current block. The motion vector in above-left block is used only when one of the other three neighboring block does not contain a motion vector. As one example, if the left block, above block, or above-right block is intra-predicted, then a motion vector for the intra-predicted block is considered unavailable. In this example, the video coder may evaluate the motion vector of the above-left block. These neighboring blocks are the same neighboring blocks used for motion prediction in the H.264/AVC video coding standard.

If three neighboring blocks are available, the motion vectors in the three neighboring blocks are employed for the motion vector prediction of the current block. In temporal prediction, if the motion vectors of the neighboring blocks are of the same type (i.e., all temporal motion vectors or all disparity motion vectors) and have the same reference indices (i.e., refer to the same reference picture), the video coder (e.g., video encoder 20 or video decoder 30) directly uses median filter as in H.264/AVC to determine a motion vector predictor. The video coder uses the motion vector predictor to determine the motion vector for the current block.

Otherwise, if the motion vectors of neighboring blocks are of different types and/or have the different reference indices, a motion vector is further derived to be used to determine the motion vector predictor. When the current reference picture is inter-view reference picture, the video coder checks (e.g., evaluates) the motion vector types and their reference indices in neighboring block positions. If the video coder determines that they have all the same motion vector type and the same reference indices, the video coder applies the median filter to determine a motion vector predictor.

In both cases (e.g., motion vector of same type and same reference indices or motion vector of different types or different reference indices), if less than three neighboring blocks are available, the video coder derives motion vectors for the unavailable blocks so that three neighboring blocks become available. A motion vector derived for a neighboring block is called a derived motion vector and generated as described below.

The video coder may determine if the current motion vector is a disparity motion vector. To do so, the video coder may determine the reference index into a reference picture list of the motion vector for the current block (i.e., video decoder 30 may determine from the signaled coded bitstream the reference index into a reference picture list of the motion vector for the current block). If the reference index identifies an inter-view reference picture (i.e., a reference picture in another view as determined from the POC value and/or view_id), the video coder may determine that the motion vector for the current block is a disparity motion vector.

If the current motion vector is a disparity motion vector, where its motion vector has a different type than that of the current motion vector or its motion vector is unavailable, the derived motion vector of this block is set to be a disparity motion vector, which is converted from the corresponding depth view component. In other words, in this example techniques for 3D-AVC, if the motion vector for the current block is a disparity motion vector, and a motion vector for a neighboring block is not a disparity motion vector or is otherwise unavailable, to derive a disparity motion vector for the neighboring block, the video coder identifies a corresponding block in the depth view component, uses the corresponding block in the depth view component to determine a disparity vector for the neighboring block, and uses the disparity vector for the neighboring block as a disparity motion vector of the neighboring block. This disparity motion vector is considered to be the derived motion vector for the neighboring block.

The video coder uses the corresponding block of the depth view component in the same view and converts the maximum value of the depth values of the four corners of this corresponding block to a disparity value. This disparity value becomes the horizontal component of the derived motion vector. The video coder sets the vertical component of the derived motion vector to be zero.

In the above example, the motion vector for the current block was a disparity motion vector. In some cases, the video coder may determine that the motion vector for the current block is a temporal motion vector. For instance, the video coder may determine the reference index into a reference picture list of the motion vector for the current macroblock and identify the reference picture from the reference index. If the reference picture belongs to the same view as the current macroblock (as determined from POC value and/or view_id), the video coder determines that the motion vector for the current macroblock is a temporal motion vector (i.e., the reference picture is a temporal reference picture).

If the current motion vector is a temporal motion vector, the video coder uses the disparity value (derived similar to above) to get a temporal motion vector of the reference block in the reference (base) view. In this example, the video coder sets the derived motion vector to be the temporal motion vector. If the temporal motion vector is considered to be unavailable (Intra block or not pointing to a reference picture in the reference view aligned with the current reference picture), the derived motion vector is set to zero.

For example, in the case where the motion vector for the current block is a temporal motion vector, to derive a temporal motion vector for the neighboring block where the motion vector for the neighboring block is not a temporal motion vector or is otherwise unavailable, the video coder may determine a disparity vector for the neighboring block using techniques described above. Then, the video coder determines the block in the base view to which the disparity vector refers. The video coder determines whether a motion vector for the block in the base view exists. If the motion vector for the block in the base view exists, the motion vector is required to be a temporal motion vector because blocks in the base view cannot be inter-view predicted. The video coder sets the temporal motion vector of the block in the base view as the derived motion vector for the neighboring block. If the motion vector for the block in the base view does not exist (i.e., intra-coded or if the motion vector for the block in the base view refers to a reference picture that is not identified as a reference picture for the current picture), the video coder sets the derived motion vector for the neighboring block equal to zero.

The above described examples are for motion vector prediction for normal modes. The following describes examples for motion vector prediction for skip and direct modes, and in particular, inter-view motion prediction for skip and direct modes in some example techniques of 3D-AVC.

The inter-view motion prediction in the 3D-AVC is performed in P-skip, B-skip, B-16×16 direct mode, and B-8×8 direct mode. The video coder may first derive a disparity vector from the neighboring blocks as well as the disparity vector converted from the depth values of the depth view component of the same view. If one available spatial neighboring block contains a disparity motion vector, this disparity motion vector becomes the disparity vector. Otherwise, for neighboring blocks that do not contain a disparity motion vector, a disparity motion vector of a block is converted from the depth values (similar to the conversion in D-MVP), afterwards median filter is applied to three neighboring blocks to get the disparity vector.

The video coder uses the derived vector to get a temporal motion vector of the reference block in the reference (base) view to identify a temporal motion vector in the reference block of the reference view. If the temporal motion vector is unavailable, the video coder first derives the reference index and the video coder applies the D-MVP techniques described above to produce a motion vector predictor. The D-MVP techniques described above refer to the depth-based motion vector prediction for normal inter-prediction mode.

Based on the above description, it can be seen that a disparity vector is a useful coding tool in 3D-AVC. For instance, the disparity vector is used to implement one or more coding tools such as for motion vector prediction; however, there may be other uses for the disparity vector as well. As described above, some 3D-AVC techniques use the depth view component of the texture view component for disparity vector derivation (i.e., for depth-first coding for dependent or enhancement views), which leads to issues such as decoding latency, implementation complexity, lack of scalability to other video coding standards, bandwidth inefficiencies if depth view components are not needed, and other potential drawbacks.

The techniques described in this disclosure allow for disparity vector derivation that does not require use of a corresponding depth view component. In this manner, the techniques allow for texture-first coding in 3D-AVC for dependent views with disparity vector derivation. To achieve disparity vector derivation, the techniques described in this disclosure rely upon the motion vector information of neighboring blocks. As one example, if a motion vector for a neighboring block is a disparity motion vector, the techniques described in this disclosure utilize the disparity motion vector of the neighboring block as a disparity vector for the current block. In this manner, video encoder 20 and video decoder 30 may determine a disparity vector for the current macroblock of a texture view component without needing to rely on the corresponding depth view component. Also, in this manner, video encoder 20 and video decoder 30 may implement one or more coding tools utilizing the derived disparity vector without using the depth view component for deriving the disparity vector.

The 3D-HEVC video coding standard utilizes a scheme referred to as a neighboring block based disparity vector (NBDV) derivation. The techniques described in this disclosure may utilize the NBDV derivation techniques in 3D-AVC. Furthermore, the NBDV derivation techniques in 3D-HEVC rely on the concept of coding units (CUs) including prediction units (PUs). Coding units and prediction units do not exist in 3D-AVC, and macroblocks are used instead, creating complexity in leveraging the NBDV techniques in 3D-AVC. The techniques described in this disclosure overcome such complexities of leverage coding tools such as NBDV derivation in 3D-HEVC for 3D-AVC.

In this sense, the techniques described in this disclosure may be considered as a neighbor block-based disparity vector derivation process in 3D-AVC. Prior to describing the disparity vector derivation for 3D-AVC that leverages NBDV derivation, the following provides additional context for NBDV derivation.

The NBDV derivation process is used for a disparity vector derivation method in the 3D-HEVC video coding standard that uses the texture-first coding order for all the views. In the current 3D-HEVC design, the video coder uses the NBDV to retrieve depth data from the depth map of a reference view.

The latest reference software description as well as the working draft of 3D-HEVC is to be available, as of Feb. 25, 2014, from http://phenix.it-sudparis.eu/jct3v/doc_end_user/current_document.php?id=460, as follows: Gerhard Tech, Krzysztof Wegner, Ying Chen, Sehoon Yea, "3D-HEVC Test Model Description draft 2," JCT3V-B1005, Joint Collaborative Team on 3D Video Coding Extension Development of ITU-T SG 16 WP 3 and ISO/IEC JTC 1/SC 29/WG 11, 2nd Meeting: Shanghai, CN, October 2012, the entire content of which is incorporated herein by reference.

The following provides an overview of the NBDV derivation process. As described above, a disparity vector (DV) may be indicative of an estimation of the disparity between two views. In many cases, neighboring blocks share almost the same motion/disparity information in video coding. Accordingly, the current block can use the motion vector information in neighboring blocks as a good disparity predictor. Because the motion information of neighboring blocks form a good disparity prediction, the NBDV derivation uses the neighboring disparity information for estimating the disparity vector in different views.

In NBDV derivation, there are several possible spatial and temporal neighboring blocks, and pre-defined spatial and neighboring blocks are evaluated as part of the NBDV derivation techniques. The video coder checks (e.g., evaluates) each of the neighboring blocks in a pre-defined order determined by the priority of the correlation between the current block and the candidate block (i.e., the neighboring block being checked). Once the video coder determines that a candidate (i.e., in one of the neighboring blocks) is inter-predicted with a disparity motion vector (i.e., inter-view predicted), the video coder converts the disparity motion vector of the neighboring block to a disparity vector for the current block.

As described in more detail below, there may be certain limitations to which neighboring blocks are evaluated. As one example, video encoder 20 and video decoder 30 may evaluate (e.g., check) neighboring blocks with motion vectors that refer to a first reference picture list (e.g., a disparity motion vector that refers to an inter-view reference picture identified in the first reference picture list) and may avoid evaluating (e.g., not evaluate or not check) neighboring blocks with motion vectors that refer to a second reference picture list (e.g., a disparity motion vector that refers to an inter-view reference picture identified in the second reference picture list).

For example, if a reference picture list index for a neighboring block is equal to 0 (identifying RefPicList0), then video encoder 20 and video decoder 30 may evaluate the motion information for purposes of determining whether a motion vector for the neighboring block is a disparity motion vector that can be used to derive the disparity vector for the current macroblock. If a reference picture list index for a neighboring block is equal to 1 (identifying RefPicList1), then video encoder 20 and video decoder 30 may avoid evaluating (e.g., not evaluate) the motion information for purposes of determining whether a motion vector for the neighboring block is a disparity motion vector that can be used to derive the disparity vector for the current macroblock.

In other words, if a neighboring block has a disparity motion vector, but that disparity motion vector refers to an inter-view reference picture in RefPicList1, video encoder 20 and video decoder 30 may utilize this disparity motion vector for deriving the disparity vector for the current block, and may keep evaluating additional neighboring blocks until a neighboring block with a disparity motion vector that refers to an inter-view reference picture is RefPicList0 is found. Video encoder 20 and video decoder 30 may then utilize this disparity motion vector to derive the disparity vector for the current block. In this way, the techniques may minimize the number of neighboring blocks that need to be evaluated to find a disparity motion vector that can be used to derive the disparity vector for the current block.

In some examples, the video coder utilizes two sets of neighboring blocks: one set is from spatial neighboring blocks and the other set is from temporal neighboring blocks. Spatial neighboring blocks are blocks in the same frame as the current macroblock, and temporal neighboring blocks are blocks in a different frame. In some examples, temporal neighboring blocks are required by in the same view as the current macroblock (i.e., the frame that includes the temporal neighboring block and the frame that includes the current macroblock are in the same view).

As described in more detail, a picture that includes a temporal neighboring block is referred to as a temporal picture. In some examples, there may be a limit to the number of temporal pictures that video encoder 20 and video decoder 30 select to identify temporal neighboring blocks. As one example, there may be two temporal pictures, and video encoder 20 and video decoder 30 may select a picture located in the first entry (entry 0) of a first reference picture list (RefPicList0) as one of the temporal pictures, and select a picture located in the first entry (entry 0) of a second reference picture list (RefPicList1) as the other temporal picture. Video encoder 20 and video decoder 30 may evaluate blocks within these selected temporal pictures. As one example, video encoder 20 and video decoder 30 may evaluate the bottom-right block, where the bottom-right block is a block located at a position bottom and to right of the current macroblock in the selected temporal pictures.

With respect to the spatial neighboring blocks, there may be certain limitations. For example, video encoder 20 and video decoder 30 may evaluate motion information of up to a maximum of four spatial neighboring blocks. These four spatial neighboring blocks include a block located left of the current macroblock, a block located above the current macroblock, a block located above-left of the current macroblock, and a block located above-right of the current macroblock.

As described in this disclosure, for motion prediction, video encoder 20 and video decoder 30 may evaluate the left block, above block, above-right block and above-left block of the current block, where the motion vector in above-left block is used only when one of the other three neighboring block does not contain a motion vector. Accordingly, in some examples, three of the four spatial neighboring blocks that video encoder 20 and video decoder 30 evaluate for purposes of deriving the disparity vector may be the same neighboring blocks used for motion prediction in the H.264/AVC video coding standard.

The following provides additional details with respect to NBDV derivation in 3D-HEVC. 3D-HEVC firstly adopted the NBDV method proposed in JCT3V-A0097, the entire content of which is incorporated herein by reference. Implicit disparity vectors were included with a simplified NBDV in JCTVC-A0126, the entire content of which is incorporated herein by reference. In addition, in JCT3V-B0047, the entire content of which is incorporated herein by reference, the NBDV is further simplified by removing the implicit disparity vectors stored in the decoded picture buffer, but also improved a coding gain with the random access point (RAP) picture selection.

JCT3V-A0097: 3D-CE5.h: Disparity vector generation results, L. Zhang, Y. Chen, M. Karczewicz, can be found, as of Feb. 25, 2014, from http://phenix.int-evry.fr/jct3v/doc_end_user/current_document.php?id=89. JCT3V-A0126: 3D-CE5.h: Simplification of disparity vector derivation for HEVC-based 3D video coding, Jaewon Sung, Moonmo Koo, Sehoon Yea (LG), can be found, as of Feb. 25, 2014, from http://phenix.int-evey.fr/jct2/doc_end_user/current_document.php?id=142. JCT3V-B0047: 3D-CE5.h related: Improvements for disparity vector derivation, J. Kang, Y. Chen, L. Zhang, M. Karczewicz, can be found, as of Feb. 25, 2014, from http://phenix.it-sudparis.eu/jct2/doc_end_user/current_document.php?id=236.

In one proposal for the NBDV derivation process for 3D-HEVC, five spatial neighboring blocks are used for the disparity vector derivation: below-left, left, above-right, above and above-left blocks of current prediction unit (PU), as denoted by A0, A1, B0, B1 or B2. It should be noted that these blocks are the same as those used in the MERGE modes in HEVC; therefore, no additional memory access is required.

For checking temporal neighboring blocks, the video coder may first perform a construction process of a candidate picture list. In this example, all the reference pictures from current view may be treated as candidate pictures. The video coder may first insert a co-located reference picture to the candidate picture list, followed by the rest of candidate pictures in the ascending order of reference index. When the reference pictures with the same reference index in both reference picture lists are available, the one in the same reference picture list of the co-located picture precedes the other one. In some examples, for each candidate picture in the candidate picture list, three candidate regions are determined for deriving the temporal neighboring blocks.

When a block is coded with inter-view motion prediction, a disparity vector may need to be derived for selecting a corresponding block in a different view. An implicit disparity vector (IDV or derived disparity vector) refers to the disparity vector derived in the inter-view motion prediction of a neighboring block. Even though the neighboring block is coded with motion prediction, the derived disparity vector is not discarded for the purpose of coding a following block. For instance, the derived disparity vector of a neighboring block (i.e., implicit disparity vector) may be used as the disparity vector for the current block.

Typically, the NBDV derivation process checks disparity motion vectors in the temporal neighboring blocks, disparity motion vectors in the spatial neighboring blocks, and then the implicit disparity vector in order; however, other orders are possible. Once, the disparity motion vector or implicit disparity vector is found, the video coder terminates the process, and uses the disparity motion vector or implicit disparity vector as the disparity vector for the current block.

In addition, there is also the concept of a depth oriented neighboring block disparity vector (DoNBDV). To derive a DoNBDV, the NBDV derivation process is used for retrieving a depth data of reference views, so that the corresponding depth data is used to derive a disparity vector. It should be noted that the depth data here is from the depth view component of the reference view, and not that of the texture view component that includes the current block. Accordingly, texture-first coding is still possible with DoNBDV derivation. The joint optimization of the NBDV and the depth data may enhance the accuracy of the disparity vector as compared to the disparity vector solely derived from the NBDV derivation process. In addition, the result of NBDV or DoNBDV derivation may be used to other coding tools, such as inter-view motion prediction and inter-view residual prediction. DoNBDV derivation is described in JCT3V-00131: 3D-CE1.h: Depth Oriented neighboring block disparity vector with virtual depth retrieval, Y. L. Chang et al., MediaTek, which as of Feb. 25, 2014, is available from http://phenix.int-evry.fr/jct3v/doc_end_user/current_document.php?id=572, the entire content of which is incorporated herein by reference.

Video encoder 20 and video decoder 30 may be configured to implement the techniques described in this disclosure. For example, video encoder 20 and video decoder 30 may be configured to implement techniques that enable efficient coding of 3D-AVC by allowing the texture to be coded first for each view component. Video encoder 20 and video decoder 30 may derive the disparity vector using example NBDV derivation techniques of this disclosure that consider more than one available disparity motion vector from the spatial/temporal neighboring blocks of the current block when the corresponding depth data is not available (or not yet available) in 3D-AVC due to the texture-first coding order.

As one example, video decoder 30 may receive a coded bitstream in a 3D-AVC compliant video coding process generated with texture-first coding of dependent views. In this example, the 3D-AVC compliant video coding process refers to a video coding process that uses video coding tools defined in the 3D-AVC video coding standard. The texture-first coding of dependent views refers to the case where the texture view components are coded prior to the corresponding depth view components (i.e., T0, D0, T1, D1, and so forth).

Video decoder 30 may decode a texture view component of a dependent view of the dependent views in the 3D-AVC compliant video coding process. In this example, to decode the texture view component, video decoder 30 may be configured to evaluate motion information of one or more neighboring blocks of a current block in the texture view component to determine whether at least one neighboring block is inter-view predicted with a disparity motion vector that refers to an inter-view reference picture in a view other than the dependent view. Also, to decode the texture view component, video decoder 30 may be configured to derive a disparity vector for the current block based on the disparity motion vector for one of the neighboring blocks. Video decoder 30 may decode a depth view component that corresponds to the texture view component subsequent to decoding the texture view component.

As another example, video encoder 20 may encode a texture view component of a dependent view in a 3D-AVC compliant video coding process. In this example, to encode the texture view component, video encoder 20 may be configured to evaluate motion information of one or more neighboring blocks of a current block in the texture view component to determine whether at least one neighboring block is inter-view predicted with a disparity motion vector that refers to an inter-view reference picture in a view other than the dependent view. Also, to encode the texture view component, video encoder 20 may be configured to derive a disparity vector for the current block based on the disparity motion vector for one of the neighboring blocks.

Video encoder 20 may encode a depth view component that corresponds to the texture view component subsequent to encoding the texture view component. Video encoder 20 may also generate for output a coded bitstream with texture-first coding of dependent views that includes the encoded texture view component and the encoded depth view component.

As discussed in further detail below, the techniques applying the NBDV derivation process to 3D-AVC may include features related to NBDV derivation in 3D-AVC and/or Motion vector prediction with NBDV derivation. The following describes examples for NBDV derivation for 3D-AVC, followed by description of example ways in which the disparity vector may be used, such as in inter-view motion prediction.

For ease of description, the techniques are described with respect to a video coder. Examples of the video coder include video encoder 20 and video decoder 30. In the following description, the term "code" may be used to describe encode or decode, as applicable. For instance, the term code refers to encode when performed by video encoder 20 and decode when performed by video decoder 30. Similarly, the term "coding" may refer to encoding when performed by video encoder 20 and decoding when performed by video decoder 30.

For example, in the techniques described in this disclosure, a device for coding video data for 3D-AVC includes a video coder, the video coder comprising one or more processors and may be configured to implement the techniques described in this disclosure. For instance, the video coder may code a texture view component of a dependent view in a 3D-AVC compliant video coding process. To code the texture view component, the video coder is configured to evaluate motion information of one or more neighboring blocks of a current block in the texture view component to determine whether at least one neighboring block is inter-view predicted with a disparity motion vector that refers to an inter-view reference picture in a view other than the dependent view, and derive a disparity vector for the current block based on the disparity motion vector for one of the neighboring blocks. The video coder is also configured to code a depth view component that corresponds to the texture view component subsequent to coding the texture view component.

In general, the video coder checks previously coded motion information of neighboring block positions to determine disparity motion vectors for the texture view components, and used for the current block being coded as the disparity vector. In addition, in some examples, the video coder may consider a motion vector as a disparity motion vector if the current block is related to other modes such as view synthesis related modes. As described above, the video coder checks pre-defined temporal and spatial neighboring block in order. In some examples, once the video coder identifies a disparity motion vector, the video coder derives the disparity vector for the current block based on the disparity motion vector for the neighboring block (i.e., the disparity motion vector becomes the disparity vector). After identifying a disparity motion vector and using the disparity motion vector derive the disparity vector, the video coder terminates the NBDV derivation process.

The NBDV derivation process used by a 3D-AVC-compliant coder may include one or more of several features adaptively designed with the coding situations of 3D-AVC. For example, as described above, a macroblock (MB) can be partitioned into sub-blocks and the sub-blocks may be further divided to a 4×4 block level. In some examples, the video coder may derive a disparity vector once for the macroblock (e.g., the NBDV process is performed once), and assigns this derived disparity vector to all of the blocks (i.e., sub-blocks or 4×4 block) within the macroblock. In some examples, the video coder may derive the disparity vector for each individual MB partition-level, a sub-MB partition-level, or even in a 4×4 block level (i.e., the NBDV process can be invoked in an individual MB partition-level, a sub-MB partition-level, or even in a 4×4 block level).

In other words, a video coder may derive a disparity vector for a current block. In some examples, the current block may be a macroblock of the texture view component. In these examples, the video coder may assign the derived disparity vector to each block within the macroblock. In some examples, the current block may be a block within a macroblock that includes a plurality of blocks. In these examples, the video coder may derive a disparity vector for each of the plurality of blocks within the macroblock.

In some examples, when checking the motion information for each neighboring block to identify a disparity motion vector, the video coder may check only the motion vector corresponding to a reference picture list (e.g., RefPicList0). In these examples, the video coder may not check the motion vector corresponding to the other reference picture list (e.g., RefPicList1).

For instance, as part of video coding, the video coder constructs one or two reference picture lists, referred to as RefPicList0 and RefPicList1. Video encoder 20 and video decoder 30 each utilize the same process to construct the reference picture list or lists. The reference picture lists identify reference pictures that can be used for inter-prediction. A reference index into the reference picture list identifies the reference picture that is to be used for inter-prediction. For bi-predicted frames or slices (i.e., B-frame or B-slice), the video coder constructs both reference picture lists, and for uni-directionally predicted frames or slices (i.e., P-frames or P-slices), the video coder constructs only one reference picture list (e.g., RefPicList0).

A neighboring block may include two motion vectors, each referring to one of the reference picture lists. In these examples, the video coder may only determine if the motion vector that refers to RefPicList0 is a disparity motion vector, and not if the motion vector that refers to RefPicList1 is a disparity motion vector, or vice-versa. In other words, to evaluate (e.g., check) motion information, the video coder may evaluate motion information of only the one or more neighboring blocks with motion vectors that refer to a first reference picture list of two reference picture lists to determine whether at least one neighboring block is inter-view predicted with the disparity motion vector, and avoid the evaluation of motion information of the one or more neighboring blocks with motion vectors that refer to a second reference picture list of the two reference picture lists to determine whether at least one neighboring block is inter-view predicted with the disparity motion vector.

As described above, the video coder may evaluate motion information of neighboring blocks, where neighboring blocks include spatial neighboring blocks and temporal neighboring blocks. Spatial neighboring blocks are blocks in the same frame or picture as the block being coded, and temporal neighboring blocks are in temporal pictures, where temporal pictures are pictures in the same view as the picture that includes the block being coded.

There may be vast possibilities of temporal pictures whose blocks can potentially be temporal neighboring blocks. However, to minimize the number of temporal pictures that need to evaluated for deriving the disparity vector, the video coder may implement one or more of the following example techniques for determining the temporal pictures used for deriving the deriving the disparity vector.

Typically, the video coder may choose up to two temporal pictures for checking disparity motion vectors in temporal neighboring blocks. The temporal neighboring blocks may be co-located (e.g., collocated) blocks. A co-located block encompasses the same area in the temporal picture that the current block encompasses in the current picture (i.e., the co-located block is located in the same position in the temporal picture that the current block is located in the current picture). For example, the video coder may evaluate the motion information of one or more temporal neighboring blocks in a first temporal picture, and if none of the temporal neighboring blocks are inter-view predicted with a disparity motion vector, the video coder may evaluate the motion information of one or more temporal neighboring blocks in a second temporal picture.

In some examples, of the two candidate temporal pictures, one candidate temporal picture is the picture with index 0 (e.g., entry 0) from RefPicList0, and the other candidate temporal picture is the picture with index 0 (e.g., entry 0) in RefPicList1. If the picture type is a P picture (i.e., RefPicList 1 is not available), the video coder may only use the picture with index 0 from RefPicList0. In other words, as part of the coding of the texture view component, the video coder may select a first temporal picture, where the first temporal picture is a picture identified at a first entry (e.g., index 0) of a first reference picture list (e.g., RefPicList0). The video coder may also select a second temporal picture, where the second temporal picture is a picture identified at a first entry (e.g., index 0) of a second reference picture list (e.g., RefPicList1).

The temporal neighboring block that the video coder may evaluate may be a block within one of the two candidate temporal pictures. For instance, in these examples, the video coder may evaluate the motion information of at least one temporal neighboring block in at least one of the first selected temporal picture or the second selected temporal picture.

Alternatively, the video coder may derive the two temporal pictures with an algorithmic process considering the anchor picture, the temporal ID, and the POC difference with the current picture. The temporal ID is a temporal identification value, where pictures with higher temporal ID values cannot be used to inter-predict pictures with lower temporal ID values, but pictures with lower temporal ID values can be used to inter-predict pictures with higher temporal ID values. For example, the video coder may select the anchor picture identified in one of the reference picture lists as the temporal picture, if available. If not available, the video coder may select the picture in the reference picture list with the smallest temporal ID value, and if multiple pictures have the same smallest temporal ID value, the video coder may select the reference picture with the least distance to the current picture based on the POC values (i.e., the picture with the smallest difference is considered to be the temporal picture).

In some examples, if the picture type is a P picture, the video coder may return only one picture from RefPicList0. In some examples, rather than determining the temporal pictures used to derive the disparity vector, video encoder 20 may signal information indicative of the two temporal pictures used to derive the disparity vector and video decoder may receive the signaled information and determine the two temporal pictures used to derive the disparity vector based on the signaled information. For example, the video encoder 20 may signal and video decoder 30 may receive the information indicative of the two temporal pictures used to derive the disparity vector as part of the slice header.

Although the above examples describe the video coder determining up to two temporal pictures, the techniques are not so limited. For instance, the video coder may use only one picture as a temporal picture. As one example, only the pictures that are anchor pictures can be temporal pictures. As another example, only the pictures that are anchor pictures can be temporal pictures.

In some examples, only the pictures that with temporal level equal to 0 (i.e., temporal ID value of 0) can be temporal pictures. In these examples, it may be possible for there to be one, two, or more than two temporal pictures.

As part of the NBDV derivation techniques, once the video coder selects the temporal picture or pictures, the video coder may evaluate the motion information for one or more temporal blocks within the temporal picture or pictures. The temporal blocks may refer to any block position inside or outside the temporally collocated MB. The positions and order of the temporal blocks that the video coder evaluates may be predefined.

As one example, video coder may evaluate the motion information of the center block inside the co-located MB, and if the center block is not inter-view predicted, may evaluate the motion information of the bottom-right corner block inside the co-located MB, or vice-versa. As another example, the video coder may evaluate the motion information of the center block inside the co-located MB, and if the center block is not inter-view predicted, may evaluate the motion information of the bottom-left corner block inside the MB, or vice-versa. As yet another example, the video coder may evaluate the motion information of the bottom-right corner block inside the co-located MB, and if the bottom-right corner block is not inter-view predicted, may evaluate the motion information of the bottom-left corner block inside the MB, or vice-versa. As more examples, the video coder may evaluate the motion information of the center block inside the co-located MB, and if the center block is not inter-view predicted, may evaluate the motion information of the bottom-right block outside the MB, or vice-versa.

In some examples, the video coder may evaluate the motion information of the center block inside the co-located MB, and if the center block is not inter-view predicted, may evaluate the motion information of the bottom-left corner block inside the MB, and if the bottom-left corner block inside the MB is not inter-view predicted, may evaluate the motion information of the bottom-right block outside the MB, or any permutation. However, if the bottom-right block position is outside the MB is not available (e.g., out of the picture boundary), the video coder may evaluate the motion information of blocks in the four corner positions. For example, the video coder may evaluate the motion information of the bottom-right corner position for disparity vector derivation.

In some examples, the video coder may evaluate the motion information of the center block inside the co-located MB, and if the center block is not inter-view predicted, may evaluate the motion information of the bottom-right block outside the MB, and if the bottom-right block outside the MB is not inter-view predicted, may evaluate the motion information of the four corner blocks of the temporally co-located MB, or any permutation. In general, any selected block positions from the inside/outside collocated MB can be considered (e.g. the center and the bottom right block only).

Rather than evaluating a plurality of blocks in the temporal picture, in some examples, the video coder may evaluate the motion information of only one temporal block (e.g., only the bottom-right block). For example, the video coder may evaluate motion information for only one block (e.g., the bottom-right block) in at least one of the candidate temporal pictures (e.g., at least one of a first selected temporal picture or a second selected temporal picture, where the first selected temporal picture is entry 0 in RefPicList0 and the second selected temporal picture is entry 0 in RefPicList1).

In some examples, only the horizontal component of a motion vector in the temporal picture is accessed. In these examples, the vertical component may not need to be stored or accessed. In some examples, one component of a motion vector in the temporal picture is clipped to a range of [−128, 127]. In these examples, the video coder may need to store only one byte for a motion vector (i.e., 8 bits can be used to represent 256 values ranging from −128 to 127).

In some examples, only one flag is stored to replace reference index to indicate whether the block contains disparity motion vector or temporal motion vector. In this case, the NBDV derivation process implemented by the video coder may always returns a disparity vector to one reference view.

The above described examples of determining the temporal picture or pictures and determining which temporal blocks within the determined temporal picture or pictures the video coder evaluates for deriving the disparity vector for the current block. The following describes examples of the video coder accessing spatial neighboring blocks for deriving the disparity vector for the current block.

In some examples, the spatial blocks may refer any block positions that are previously coded in the same picture. The video coder may evaluate the motion information for these spatial blocks and if the motion vector of the spatial block indicates that the spatial block is inter-view predicted, the video coder may utilize the disparity motion vector of the spatial block for deriving the disparity vector.

In some examples, the spatial blocks include up to a maximum of four spatial neighboring blocks such as the neighboring blocks in the left, the above, the above-left, and the above-right positions of the current block being coded. In these examples, three of the four neighboring blocks are the same as the neighboring blocks used in motion prediction in the H.264/AVC video coding standard. In some examples, the video coder may consider the above-left position only if the above-right position is not available (e.g., out of the picture boundary).

As described above, the video coder may evaluate motion information neighboring blocks in a pre-defined order and when the video coder identifies a disparity motion vector for a neighboring block (that in some examples is required to refer to a RefPicList0), the video coder may use the disparity motion vector to derive the disparity vector (i.e., convert the disparity motion vector to the disparity vector) and terminate the NBDV derivation process even if there are other neighboring blocks whose motion information has not yet been evaluated. However, the techniques described in this disclosure are not so limited.

As one example, once the video coder identifies a disparity motion vector with its horizontal component unequal to 0, the video coder may convert the disparity motion vector to the disparity vector and terminate the NBDV derivation process at that juncture, and not after the first identified disparity motion vector. As another example, once the video coder identifies a non-zero disparity motion vector, the video coder may convert the disparity motion vector to the disparity vector and terminate the NBDV derivation process at that juncture, and not after the first identified disparity motion vector.

In some examples, furthermore, when no disparity motion vector is identified within spatial/temporal neighboring blocks, the video coder uses a zero disparity vector. In other words, the video coder may set the disparity vector for the current block equal to zero if none of the one or more neighboring blocks is inter-view predicted.

In some examples, there may be certain restrictions on the disparity vector derived using NBDV derivation techniques for 3D-AVC. As one example, the video coder may set the vertical component of the derived disparity vector to be the same as the vertical component of the disparity motion vector so that the vertical component of the disparity vector is not set to 0. In one example, the video coder may always set the vertical component of the disparity vector equal to 0 at the end of the derivation process. For instance, the video coder may set a horizontal component of the disparity vector equal to a horizontal component of the disparity motion vector, and set a vertical component of the disparity vector equal to zero.

In another example, the video coder may or may not set the vertical component of the disparity vector equal to 0, depending on a coding mode using the disparity vector. For example, in inter-view motion prediction, the video coder may convert the disparity vector yielded by the NBDV derivation process into a disparity motion vector as a disparity motion vector predictor. The converted disparity motion vector may have a zero vertical component due to the "inter-view motion prediction mode" no matter what the vertical component of the disparity motion vector was. However, it may be possible that the disparity motion vector is unchanged. The same situation can be applied to temporal motion prediction and P-skip/B-direct mode when NBDV derivation is used.

As described above, the video coder may utilize the derived disparity vector for purposes of motion vector prediction as one example of one or more coding tools that the video coder may implement utilizing the derived motion vector without using the depth view component for deriving the disparity vector. The following describes motion vector prediction with NBDV derivation.

In the texture-first coding order, the NBDV derivation process is employed to be the disparity vector in the motion vector prediction process and used to identify a reference block of the reference view or used to be converted to a disparity motion vector of the current coding block. As examples, the following cases are described.

The video coder (e.g., video encoder 20 and video decoder 30) may utilize D-MVP (Depth based motion vector prediction) derivation for normal inter-prediction modes. However, rather than relying on depth, the techniques utilize NBDV derivation for motion vector prediction. Normal inter-prediction modes refer to inter-prediction modes where the coded bitstream includes information from which a motion vector is derived and includes residual data, where the residual data is the difference between the block referred to by the motion vector and the actual current block.

In a first example technique for motion vector prediction in normal inter-prediction modes, during the motion vector prediction process, the video coder may determine whether the reference picture used to inter-predict the current block is an inter-view reference picture. As one example, video encoder 20 may signal in the coded bitstream the reference index into a reference picture list that was used for inter-prediction encoding the current block, and video decoder 30 may identify the reference picture used for inter-prediction decoding of the current block. Video decoder 30 may then determine whether the identified reference picture is an inter-view reference picture or a temporal reference picture based on the POC value and/or view_id value of the reference picture. Video encoder 20 selected the reference picture used for inter-prediction, and therefore, video encoder 20 may determine whether the selected reference picture is an inter-view reference picture or a temporal reference picture.

In other words, the video coder may determine whether a reference index for the current block corresponds to an inter-view reference picture. In this sense, the reference picture that is to be used for inter-prediction may be known, but the motion vector that refers to be reference picture may be unknown and may be predicted using motion vector prediction techniques.

If the reference picture is an inter-view reference picture, the video coder may determine whether a neighboring block that is used for motion vector prediction is not inter-view predicted. As described above, in motion vector prediction, the video coder utilizes the motion vector for left block, above block, above-right block, and above-left block only if a motion vector for one of the other blocks is unavailable. In this disclosure, the left block, above block, above-right block, and above-left block only if a motion vector for one of the other blocks is unavailable are examples of neighboring blocks that are used for motion vector prediction.

In this example technique, if the reference index for the current block corresponds to an inter-view reference picture and a neighboring block that is used for motion vector prediction is not inter-view predicted (i.e., not predicted with a disparity motion vector that refers to an inter-view reference picture), the video coder may assign the derived disparity vector, using the NBDV derivation techniques described above, as a disparity motion vector to the neighboring block that is used for motion vector prediction and is not inter-view predicted. As an example, assume that the left block is not inter-view predicted, and therefore, there is no disparity motion vector for the left block. However, the current block is inter-view predicted as indicated by the reference index corresponding to an inter-view reference picture.

In this example, the video coder considers the derived disparity vector for the current block as if it is a disparity motion vector for the left block for purposes of motion vector prediction. It should be understood that the derived disparity motion vector for the current block, now assigned to as a disparity motion vector for the left block, is not used to inter-predict the left block. Rather, the derived disparity vector replaces or substitutes as a disparity motion vector of the left block, if the left block is not inter-view predicted, for purposes of motion vector prediction for the current block.

Afterwards, the median filter is applied to the motion vectors of the neighboring blocks to derive the motion vector predictor. For example, the video coder constructs a candidate list of motion vectors, where the candidate list includes disparity motion vectors in this case because the current block is inter-view predicted (e.g., three disparity motion vectors). If one of neighboring blocks used for motion vector prediction is not inter-view predicted, the video coder substitutes the derived disparity vector as the candidate motion vector into the list of three disparity motion vectors. The video coder determines a motion vector predictor for the current block utilizing median filtering, where the median filtering utilizes the derived disparity vector for the current block that is assigned as the disparity motion vector to the neighboring block that is used for motion vector prediction as one of the motion vectors that is filtered.

The video coder then inter-prediction codes (decodes for video decoder 30 or encodes for video encoder 20) the current block based on the motion vector predictor. For instance, the video coder determines a motion vector difference (MVD) (e.g., video encoder 20 signals the MVD and video decoder 30 receives the MVD), the video coder then adds the MVD to the motion vector predictor to determine the motion vector for the current block (e.g., the disparity motion vector for the current block in this example). The video coder then inter-prediction codes the current block with the determined motion vector that refers to the reference picture identified by the reference index for the current block.

In a second example technique for motion vector prediction, the video coder may determine whether the current block is inter-view predicted (e.g., determine whether a reference index into a reference picture list for the current block corresponds to an inter-view reference picture). In this example, if the reference index for the current block corresponds to the inter-view reference picture, the video coder may utilize the derived disparity vector for the current block as the motion vector predictor for the current. In this example, the video coder may not utilize median filtering to determine the motion vector predictor, but instead, directly converts the derived disparity vector to a disparity motion vector to predict the current motion vector (i.e., the motion vector for the current block). The video coder may inter-prediction code the current block based on the motion vector predictor as described above.

The above examples for motion vector prediction were based on the case where the current block is inter-view predicted. The following describes one example technique for motion vector prediction using the derived disparity vector when the current block is not inter-view predicted, but is predicted with a temporal reference picture.

The video coder may determine whether the current block is predicted with a temporal reference picture based on the reference picture that corresponds to the reference index into the reference picture list. In some examples, it may be possible that a neighboring block that is used for motion vector prediction is not inter-predicted with a temporal motion vector.

In this case, the video coder may utilize the disparity vector derived using NBDV derivation techniques for the current block to located a reference block in a reference view (i.e., located the block referred to by the disparity vector). If the block referred to by the disparity vector has an available temporal motion vector, the video coder may assign this temporal motion vector as the motion vector for neighboring block used for motion vector prediction that is not inter-predicted with a temporal motion vector. In other words, the video coder substitutes the temporal motion vector for the block referred to by the disparity vector as the temporal motion vector for the neighboring block for purposes of motion vector prediction. The video coder then uses median filtering to determine the motion vector predictor similar to above.

In general, for motion vector prediction, the candidate motion vectors that are used to determine a motion vector predictor may need to be the same type of motion vector as the motion vector that will be used for the current block. For instance, if the current block is inter-view predicted as determined from the reference index, the motion vector for the current block is a disparity motion vector. In some examples, the candidate motion vectors that are used to determine motion vector predictor for the current block should also be disparity motion vectors. In this case, the disparity vector is substituted as a disparity motion vector for a neighboring block that is not inter-view predicted or is directly used as the motion vector predictor. If the current block is inter-predicted with a reference picture in same view as determined from the reference index, the motion vector for the current block is a temporal motion vector. In some examples, the candidate motion vectors that are used to determine motion vector predictor for the current block should also be temporal motion vectors. In this case, the disparity vector is used to identify a block, and the temporal motion vector for this identified block is substituted as the temporal motion vector for a neighboring block that is not inter-view predicted.

The above described examples with respect to motion vector prediction with respect to normal inter-prediction modes. The following describes example techniques for motion vector prediction with respect to skip and direct modes using NBDV.

Skip mode and direct mode refer to inter-prediction modes in which no residual or motion vectors are included in the coded bitstream for decoding the current block. In contrast, in normal inter-prediction modes, video encoder 20 signals information from which the motion vector is derived or signals information identifying the motion vector. In addition, in normal inter-prediction modes, video encoder 20 signals a residual between the block identified by the motion vector and the actual current block. Skip mode is generally associated with uni-directionally predicted pictures or slices (e.g., P-frame or -slice) and direct mode is generally associated with bi-predicted pictures or slices (e.g., B-frame or -slice). For purposes of brevity, inter-view motion vector prediction for skip and direct modes using NBDV derivation process are described together.

In one example, the video coder may utilize the disparity vector derived from the NBDV derivation techniques for the current block, together with the disparity motion vectors of the neighboring block to determine a disparity vector that is used for inter-view motion prediction for skip and direct modes. The disparity vector derived from the NBDV derivation techniques and the disparity vector that is used for inter-view motion prediction for skip and direct modes may be different or may be the same. The video coder utilizes the disparity vector that is used for inter-view motion prediction to identify a block in a reference view, and determines the motion vector for the identified block. The video coder converts the motion vector for the identified block into the motion vector for the current block as in the current 3D-AVC.

In some examples, if there is not a disparity motion vector for a neighboring block, then the video coder may substitute the disparity vector derived for the current block from the NBDV derivation techniques as the disparity motion vector for the neighboring block, instead of the disparity vector of the neighboring block. In this manner, the neighboring blocks of the current block may practically have the same disparity vector as the current block when used for the prediction of the final disparity vector used for inter-view motion prediction.

The above examples described one way to utilize the disparity vector for inter-view motion prediction for skip and direct modes using NBDV derivation techniques. However, aspects of this disclosure are not so limited. As one example, the video coder may directly use the disparity vector derived from NBDV derivation techniques for inter-view motion prediction for skip and direct modes. As another example, if the derived disparity vector is available, it is directly used for inter-view motion prediction; otherwise, median filtering is used as described above.

Figure 2:
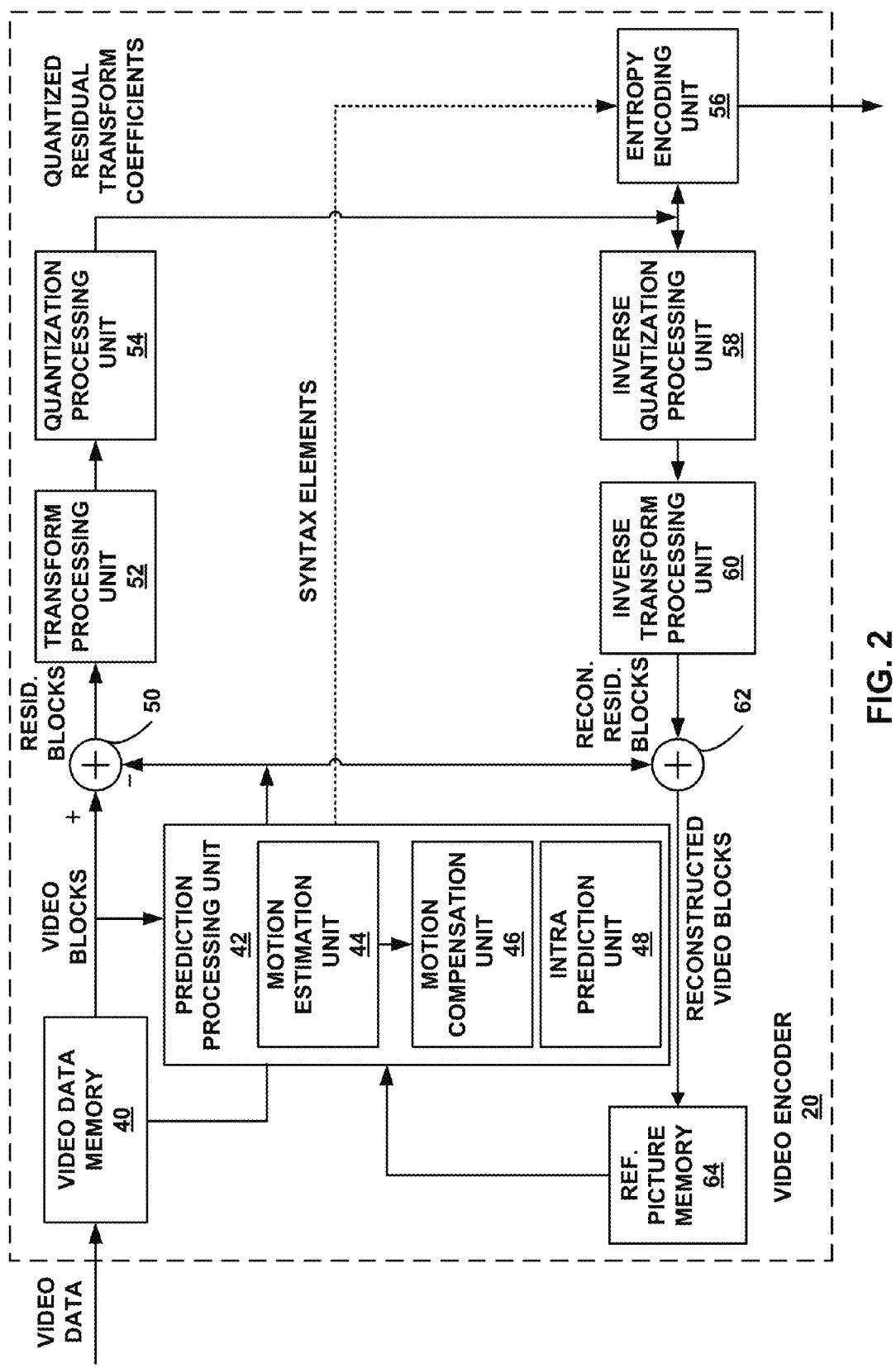
FIG. 2 is a block diagram illustrating an example video encoder that may implement the techniques described in this disclosure.

FIG. 2 is a block diagram illustrating an example of a video encoder that may implement the techniques described in this disclosure. For example, FIG. 2 illustrates video encoder 20 which may perform intra- and inter-coding of video blocks within video slices. For example, video encoder 20 may perform inter-prediction encoding or intra-prediction encoding. Intra-coding relies on spatial prediction to reduce or remove spatial redundancy in video within a given video frame or picture. Inter-coding relies on temporal prediction or inter-view prediction to reduce or remove temporal redundancy within adjacent frames or pictures of a video sequence or redundancy between pictures in different views. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes video data memory 40, prediction processing unit 42, reference picture memory 64, summer 50, transform processing unit 52, quantization processing unit 54, and entropy encoding unit 56. Prediction processing unit 42 includes motion estimation unit 44, motion compensation unit 46, and intra-prediction unit 48. For video block reconstruction, video encoder 20 also includes inverse quantization processing unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

Video data memory 40 may store video data to be encoded by the components of video encoder 20 (e.g., configured to store video data). The video data stored in video data memory 40 may be obtained, for example, from video source 18. Reference picture memory 64 is one example of a decoding picture buffer (DPB that stores reference video data for use in encoding video data by video encoder 20 (e.g., in intra- or inter-coding modes, also referred to as intra- or inter-prediction coding modes). Video data memory 40 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and reference picture memory 64 may be provided by the same memory device or separate memory devices. In various examples, video data memory 40 may be on-chip with other components of video encoder 20, or off-chip relative to those components.

Video encoder 20 receives video data, and a partitioning unit (not shown) partitions the data into video blocks. This partitioning may also include partitioning into slices, tiles, or other larger units, as wells as video block partitioning (e.g., macroblock partitions and sub-blocks of partitions). Video encoder 20 generally illustrates the components that encode video blocks within a video slice to be encoded. The slice may be divided into multiple video blocks (and possibly into sets of video blocks referred to as tiles). Prediction processing unit 42 may select one of a plurality of possible coding modes, such as one of a plurality of intra coding modes (intra-prediction coding modes) or one of a plurality of inter coding modes (inter-prediction coding modes), for the current video block based on error results (e.g., coding rate and the level of distortion). Prediction processing unit 42 may provide the resulting intra- or inter-coded block to summer 50 to generate residual block data and to summer 62 to reconstruct the encoded block for use as a reference picture.

Intra-prediction unit 48 within prediction processing unit 42 may perform intra-predictive coding of the current video block relative to one or more neighboring blocks in the same frame or slice as the current block to be coded to provide spatial compression. Motion estimation unit 44 and motion compensation unit 46 within prediction processing unit 42 perform inter-predictive coding of the current video block relative to one or more predictive blocks in one or more reference pictures to provide temporal compression.

Motion estimation unit 44 may be configured to determine the inter-prediction mode for a video slice according to a predetermined pattern for a video sequence. The predetermined pattern may designate video slices in the sequence as P slices or B slices. Motion estimation unit 44 and motion compensation unit 46 may be highly integrated, but are illustrated separately for conceptual purposes. Motion estimation, performed by motion estimation unit 44, is the process of generating motion vectors, which estimate motion for video blocks. A motion vector, for example, may indicate the displacement of a video block within a current video frame or picture relative to a predictive block within a reference picture.

A predictive block is a block that is found to closely match the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 44 may perform a motion search relative to the full pixel positions and fractional pixel positions and output a motion vector with fractional pixel precision.

Motion estimation unit 44 calculates a motion vector for a video block in an inter-coded (inter-prediction coded) slice by comparing the position of the video block to the position of a predictive block of a reference picture. The reference picture may be selected from a first reference picture list (RefPicList0) or a second reference picture list (RefPicList1), each of which identify one or more reference pictures stored in reference picture memory 64. Motion estimation unit 44 sends the calculated motion vector to entropy encoding unit 56 and motion compensation unit 46.

Motion compensation, performed by motion compensation unit 46, may involve fetching or generating the predictive block based on the motion vector determined by motion estimation, possibly performing interpolations to sub-pixel precision. Upon receiving the motion vector for the current video block, motion compensation unit 46 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 46 may also generate syntax elements associated with the video blocks and the video slice for use by video decoder 30 in decoding the video blocks of the video slice.

Intra-prediction unit 48 may intra-predict a current block, as an alternative to the inter-prediction performed by motion estimation unit 44 and motion compensation unit 46, as described above. In particular, intra-prediction unit 48 may determine an intra-prediction mode to use to encode a current block. In some examples, intra-prediction unit 48 may encode a current block using various intra-prediction modes, e.g., during separate encoding passes, and intra-prediction unit 48 (or a mode select unit, in some examples) may select an appropriate intra-prediction mode to use from the tested modes. For example, intra-prediction unit 48 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 48 may calculate ratios from the distortions and rates for the various encoded blocks to determine which intra-prediction mode exhibits the best rate-distortion value for the block.

In any case, after selecting an intra-prediction mode for a block, intra-prediction unit 48 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 42 generates the predictive block for the current video block via either inter-prediction or intra-prediction, video encoder 20 forms a residual video block by subtracting the predictive block from the current video block. The residual video data in the residual block may be applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization processing unit 54. Quantization processing unit 54 quantizes the transform coefficients to further reduce bit rate. The quantization process may reduce the bit depth associated with some or all of the coefficients. The degree of quantization may be modified by adjusting a quantization parameter. In some examples, quantization processing unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization processing unit 58 and inverse transform processing unit 60 apply inverse quantization and inverse transformation, respectively, to reconstruct the residual block in the pixel domain for later use as a reference block of a reference picture. Motion compensation unit 46 may calculate a reference block by adding the residual block to a predictive block of one of the reference pictures within one of the reference picture lists. Motion compensation unit 46 may also apply one or more interpolation filters to the reconstructed residual block to calculate sub-integer pixel values for use in motion estimation. Summer 62 adds the reconstructed residual block to the motion compensated prediction block produced by motion compensation unit 46 to produce a reference block for storage in reference picture memory 64. The reference block may be used by motion estimation unit 44 and motion compensation unit 46 as a reference block to inter-predict a block in a subsequent video frame or picture.

In this manner, video encoder 20 is an example of a video encoder that is configured to implement one or more example techniques described in this disclosure. For example, video data memory 40 stores video data. The video data may include a texture video component of a dependent view and a depth view component that corresponds to the texture view component, each of which video encoder 20 is to encode in a 3D-AVC compliant video coding process.

In the techniques described in this disclosure, video encoder 20 may include one or more processors that are configured to encode, in a 3D-AVC compliant video coding process, a texture view component of a dependent view of the video data. As described above, each view in a 3D-AVC includes a texture view component and depth view component. There is one base view and one or more enhancement or dependent views in 3D-AVC, where texture view components of the one or more enhancement or dependent views may be inter-view predicted.

To encode the texture view component, video encoder 20 may be configured to evaluate motion information of one or more neighboring blocks of a current macroblock in the texture view component to determine whether at least one neighboring block is inter-view predicted with a disparity motion vector that refers to an inter-view reference picture in a view other than the dependent view. In some examples, video encoder 20 may evaluate motion information of neighboring blocks with motion vectors that refer to a first reference picture list (RefPicList0) and avoid evaluating motion information of neighboring blocks with motion vectors that refer to a second reference picture list (RefPicList1).

The neighboring blocks are spatial and temporal neighboring blocks. The temporal neighboring blocks may be in at least one of a first selected picture and a second selected picture. The first selected picture is a picture identified in entry 0 (index 0) of the first reference picture list (RefPicList0). The second selected picture is a picture identified in entry 0 (index 0) of the second reference picture list (RefPicList1). There may be up to a maximum of four spatial neighboring blocks that video encoder 20 evaluates, where three of the four spatial neighboring blocks are the same neighboring blocks as those used in motion prediction in the H.264/AVC video coding standard.

Video encoder 20 may derive a disparity vector for the current macroblock based on the disparity motion vector for one of the neighboring blocks. Video encoder 20 assign the derived disparity vector for the current macroblock to blocks within the current macroblock. For texture-first coding, video encoder 20 may encode a depth view component, of the video data, that corresponds to the texture view component subsequent to encoding the texture view component.

As one example, video encoder 20 may select the candidate temporal pictures, and may evaluate a temporal block within one of these candidate temporal pictures. For instance, video encoder 20 may select a first temporal picture, which is a picture identified in a first entry (e.g., entry 0) of a first reference picture list (e.g., RefPicList0), and select a second temporal picture, which is a picture identified in a first entry (e.g., entry 0) of a second reference picture list (e.g., RefPicList1). The one or more neighboring blocks include at least one temporal neighboring block in at least one of the first selected temporal picture or the second selected temporal picture. In some examples, there may be only one temporal neighboring block (e.g., the bottom-right block).

As another example (which may be used in combination with the above example or separately), video encoder 20 may evaluate motion information of only one or more neighboring blocks with motion vectors that refer to a first reference picture list (e.g., RefPicList0) of two reference picture lists to determine whether at least one neighboring block is inter-view predicted with the disparity motion vector. In these examples, video encoder 20 may avoid the evaluation of motion information of the one or more neighboring blocks with motion vectors that refer to a second reference picture list (e.g., RefPicList1) of the two reference picture lists to determine whether at least one neighboring block is inter-view predicted with the disparity motion vector.

In some examples, prediction processing unit 42 of video encoder 20 may be one example of a processor configured to implement the examples described in this disclosure. In some examples, a unit (e.g., one or more processors) other than prediction processing unit 42 may implement the examples described above. In some examples, prediction processing unit 42 in conjunction with one or more other units of video encoder 20 may implement the examples described above. In some examples, a processor of video encoder 20 (not shown in FIG. 2) may, alone or in conjunction with other processors of video encoder 20, implement the examples described above.

Figure 3:
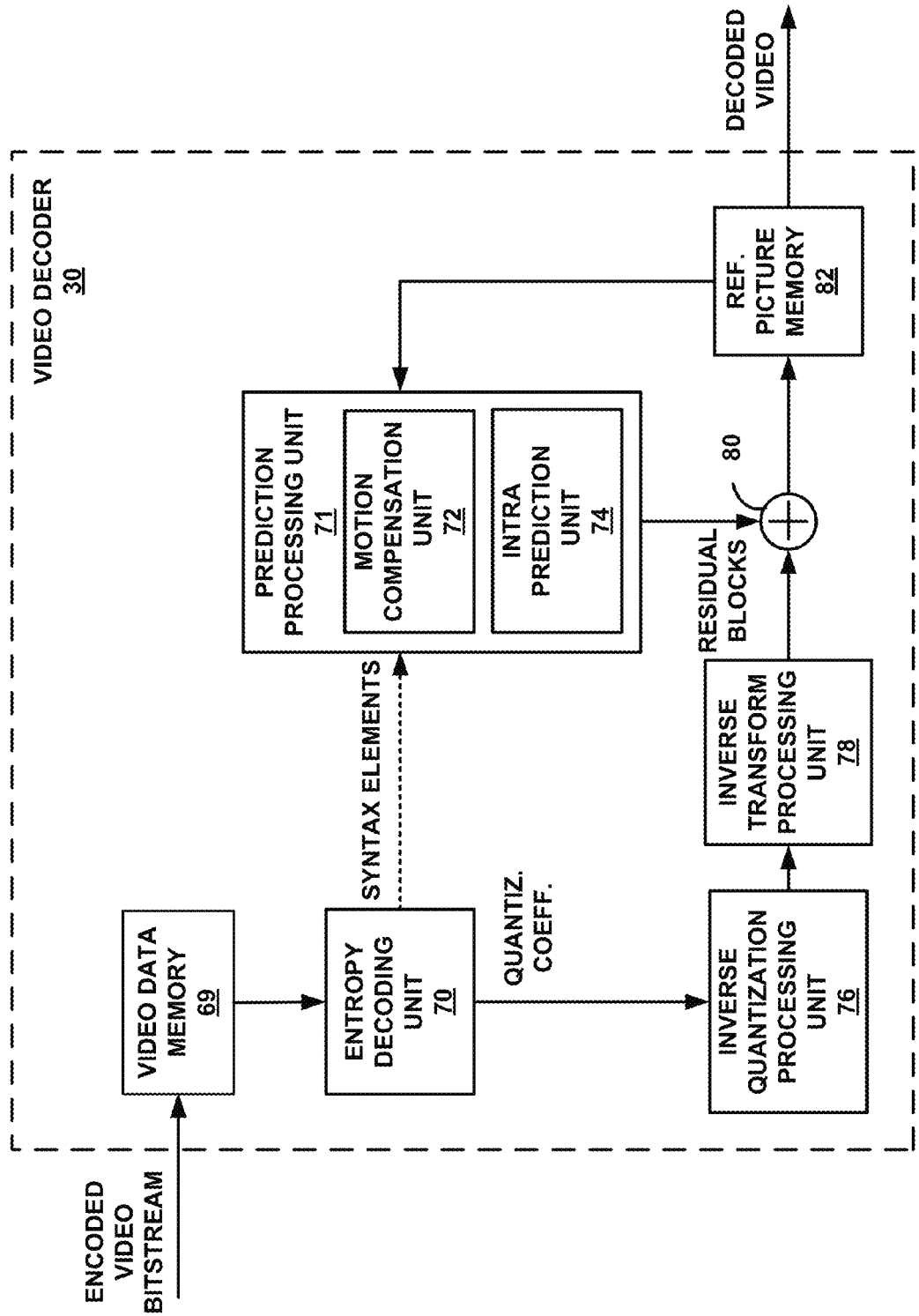
FIG. 3 is a block diagram illustrating an example video decoder that may implement the techniques described in this disclosure.

FIG. 3 is a block diagram illustrating an example of a video decoder that may implement the techniques described in this disclosure. For example, video decoder 30 may perform inter-prediction decoding or intra-prediction decoding. FIG. 3 illustrates video decoder 30. In the example of FIG. 3, video decoder 30 includes video data memory 69, entropy decoding unit 70, prediction processing unit 71, inverse quantization processing unit 76, inverse transform processing unit 78, summer 80, and reference picture memory 82. Prediction processing unit 71 includes motion compensation unit 72 and intra-prediction unit 74. Video decoder 30 may, in some examples, perform a decoding pass generally reciprocal to the encoding pass described with respect to video encoder 20 from FIG. 2.

Video data memory 69 may store video data (e.g., configured to store video data), such as an encoded video bitstream, to be decoded by the components of video decoder 30. The video data stored in video data memory 69 may be obtained, for example, from storage device 34, from a local video source, such as a camera, via wired or wireless network communication of video data, or by accessing physical data storage media. Video data memory 69 may form a coded picture buffer (CPB) that stores encoded video data from an encoded video bitstream.

Reference picture memory 82 is one example of a decoded picture buffer (DPB) that stores reference video data for use in decoding video data by video decoder 30 (e.g., in intra- or inter-coding modes). Video data memory 69 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 69 and reference picture memory 82 may be provided by the same memory device or separate memory devices. In various examples, video data memory 69 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors, and other syntax elements. Entropy decoding unit 70 forwards the motion vectors and other syntax elements to prediction processing unit 71. Video decoder 30 may receive the syntax elements at the video slice level and/or the video block level.

When the video slice is coded as an intra-coded (I) slice, intra-prediction unit 74 of prediction processing unit 71 may generate prediction data for a video block of the current video slice based on a signaled intra prediction mode and data from previously decoded blocks of the current frame or picture. When the video frame is coded as an inter-coded (i.e., B or P) slice, motion compensation unit 72 of prediction processing unit 71 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists (RefPicList0 and RefPicList1) using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization processing unit 76 inverse quantizes (i.e., de-quantizes), the quantized transform coefficients provided in the bitstream and decoded by entropy decoding unit 70. The inverse quantization process may include use of a quantization parameter calculated by video encoder 20 for each video block in the video slice to determine a degree of quantization and, likewise, a degree of inverse quantization that should be applied. Inverse transform processing unit 78 applies an inverse transform (e.g., an inverse DCT, an inverse integer transform, or a conceptually similar inverse transform process), to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 is an example of a video decoder that is configured to implement one or more example techniques described in this disclosure. For example, video data memory 69 stores video data. The video data may include information from which video decoder 30 can decode a texture video component of a dependent view and a depth view component that corresponds to the texture view component, each of which video encoder 20 is encoded in a 3D-AVC compliant video coding process.

In the techniques described in this disclosure, video decoder 30 may include one or more processors that are configured to decode, in a 3D-AVC compliant video coding process, a texture view component of a dependent view of the video data. To decode the texture view component, video decoder 30 may be configured to evaluate motion information of one or more neighboring blocks of a current macroblock in the texture view component to determine whether at least one neighboring block is inter-view predicted with a disparity motion vector that refers to an inter-view reference picture in a view other than the dependent view. In some examples, video decoder 30 may evaluate motion information of neighboring blocks with motion vectors that refer to a first reference picture list (RefPicList0) and avoid evaluating motion information of neighboring blocks with motion vectors that refer to a second reference picture list (RefPicList1).

The neighboring blocks are spatial and temporal neighboring blocks. The temporal neighboring blocks may be in at least one of a first selected picture and a second selected picture. The first selected picture is a picture identified in entry 0 (index 0) of the first reference picture list (RefPicList0). The second selected picture is a picture identified in entry 0 (index 0) of the second reference picture list (RefPicList1). There may be up to a maximum of four spatial neighboring blocks that video decoder 30 evaluates, where three of the four spatial neighboring blocks are the same neighboring blocks as those used in motion prediction in the H.264/AVC video coding standard.

Video decoder 30 may derive a disparity vector for the current macroblock based on the disparity motion vector for one of the neighboring blocks. Video decoder 30 may assign the derived disparity vector for the current macroblock to blocks within the current macroblock. For texture-first coding, video decoder 30 may decode a depth view component, of the video data, that corresponds to the texture view component subsequent to decoding the texture view component.

As one example, video decoder 30 may select the candidate temporal pictures, and may evaluate a temporal block within one of these candidate temporal pictures. For instance, video decoder 30 may select a first temporal picture, which is a picture identified in a first entry (e.g., entry 0) of a first reference picture list (e.g., RefPicList0), and select a second temporal picture, which is a picture identified in a first entry (e.g., entry 0) of a second reference picture list (e.g., RefPicList1). The one or more neighboring blocks include at least one temporal neighboring block in at least one of the first selected temporal picture or the second selected temporal picture. In some examples, there may be only one temporal neighboring block (e.g., the bottom-right block).

As another example (which may be used in combination with the above example or separately), video decoder 30 may evaluate motion information of only one or more neighboring blocks with motion vectors that refer to a first reference picture list (e.g., RefPicList0) of two reference picture lists to determine whether at least one neighboring block is inter-view predicted with the disparity motion vector. In these examples, video decoder 30 may avoid the evaluation of motion information of the one or more neighboring blocks with motion vectors that refer to a second reference picture list (e.g., RefPicList1) of the two reference picture lists to determine whether at least one neighboring block is inter-view predicted with the disparity motion vector.

In some examples, prediction processing unit 71 of video decoder 30 may be one example of a processor configured to implement the examples described in this disclosure. In some examples, a unit (e.g., one or more processors) other than prediction processing unit 71 may implement the examples described above. In some examples, prediction processing unit 71 in conjunction with one or more other units of video decoder 30 may implement the examples described above. In yet some other examples, a processor of video decoder 30 (not shown in FIG. 3) may, alone or in conjunction with other processors of video decoder 30, implement the examples described above.

The following describes the example manners in which video encoder 20 and video decoder 30 may implement the techniques described above and are described with a video coder for brevity, where a video coder may be video encoder 20 or video decoder 30 based on the context. The techniques described in this disclosure should not be considered limited to any of the specific example implementations. Any of the techniques can be combined with one or more of the other techniques for disparity vector derivation. Each aspect of the techniques can be combined to one complete technique.

Initially, the video coder may determine one or more temporal pictures. For each temporal picture, the video coder may check (e.g., evaluate) one or more determined temporal neighboring blocks pre-defined by block positions. For instance, the video coder may determine temporal pictures to be one or more pictures in the reference picture lists. Each temporal picture may be required to belong to the same view as the current picture.

In one example, the video coder may determine the temporal pictures using an implicit derivation technique. In the following, the video coder determines up to two temporal pictures: tempPic[0] and tempPic[1].

As one example for implicitly determining the temporal pictures, the first entries in RefPicList0 and RefPicList1 are used and up to two temporal pictures are used. In one example, when the current slice is a P slice, RefPicList0[0] is the only temporal picture, and when the current slice is a B slice, RefPicList0[0] is the first temporal picture and RefPicList1[0] is the second temporal picture. As another example, RefPicList1[0] is the first temporal picture and RefPicList0[0] is the second temporal picture. As yet another example, any two temporal reference pictures in the reference picture lists or in the DPB (decoded picture buffer) can be chosen as the temporal pictures.

As another example for implicitly determining the temporal pictures, the video coder may select the co-located picture (i.e., RefPicList1[0]), as used in H.264/AVC temporal direct mode, as a first temporal picture. The video coder selects the second temporal picture in a way that the second temporal picture is more likely to include more disparity motion vectors.

The following describes examples for implicitly determining the temporal pictures.

i=0;

If the current slice type is B, tempPic[i]=RefPicList1[0], i++;

tempPic[i] is derived as follows:
  For each picture Pic in RefPicList0 or RefPicList1, if Pic is an anchor picture, tempPic[i]=Pic, return;
  For pictures in RefPicList0 and RefPicList1 if available, tempPic[i] is set to the picture with the lowest temporal_id. If there are multiple ones having the same temporal_id, tempPic[i] is set to be the picture with a less POC difference to the current picture. Alternatively, even when RefPicList1 is available, pictures in RefPicList1 are not considered in this step.

As another example, the temporal_id is not considered in the middle of the derivation process as follows:

i=0;

If the current slice type is B, tempPic[i]=RefPicList1[0], i++;

tempPic[i] is derived as follows:
  For each picture Pic in RefPicList0 or RefPicList1, if Pic is an anchor picture, tempPic[i]=Pic, return;
  If the current slice is a P slice, for pictures in RefPicList0, tempPic[i] is set to the picture with the one having the least POC difference to the current picture.
  If the current slice is a B slice, check pictures in RefPicList0 followed by the pictures in RefPicList1 in a way that tempPic[i] is set to be the picture with the one having the least POC difference to the current picture.

In some examples, instead of implicit derivation of the temporal pictures, explicit derivation may be possible. For example, the number of temporal pictures and the temporal pictures can be explicitly signaled in the slice header or picture parameter set by video encoder 20 that video decoder 30 receives. In one example, only one temporal picture is explicitly signaled.

In one example, the video coder may determine that the first temporal picture is always to be RefPicList1[0] for B slice and RefPicList0[0] for P slice. In this example, the second temporal picture is signaled by video encoder 20 and received by video decoder 30 in the slice header as ref_idx_temp_pic and the second temporal picture is derived to be RefPicList0[ref_idx_temp_pic]. In another example, the second temporal picture is not available thus not signaled for a P slice. In another example, both reference index values are signaled as indices ref_idx_temp_pic0 and ref_idx_temp_pic1 and the temporal pictures are identified as RefPicList0[ref_idx_temp_pic0] and RefPicList0[ref_idx_temp_pic1]. In another example, both reference index values are signaled as indices ref_idx_temp_pic0 and ref_idx_temp_pic1 and the temporal pictures are identified as RefPicList0[ref_idx_temp_pic0] and RefPicList1[ref_idx_temp_pic1].

As additional examples, both reference index values are signaled as indices ref_idx_temp_pic0 and ref_idx_temp_pic1. However, for a B slice, one additional flag list0_flag0 and list0_flag1 (inferred to be 0 for P slice) is signaled if the current slice is a B slice, and the temporal pictures are identified as RefPicListX0[ref_idx_temp_pic0] and RefPicListX1[ref_idx_temp_pic1], with X0 and X1 equal to list0_flag0 and list0_flag1, respectively.

With the determined temporal pictures, the video coder may evaluate the motion information of temporally co-located block positions to determine whether neighboring block is inter-view predicted with a disparity motion vector. Basically, pre-defined 4×4 blocks of the temporally co-located macro-block are checked to search a disparity motion vector.

Figure 4A:
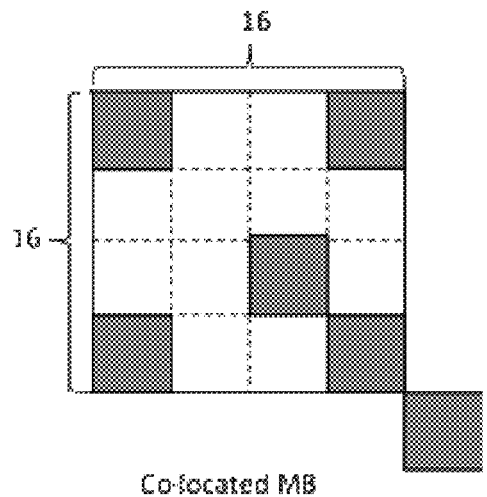
FIGS. 4A-H illustrate example block positions for the temporally co-located macroblock (MB) that are checked for disparity vector derivation.

FIGS. 4A-H illustrate example block positions for the temporally co-located macroblock (MB) that are checked for disparity vector derivation. As shown in FIG. 4A, the block positions can be inside the macro-block such as the four corner blocks and the center block or even outside the macroblock such as the bottom-right block. Alternatively, however, the positions can be any 4×4 blocks in the collocated MB and any neighboring blocks outside the MB. Alternatively, however, several selective positions in all the possible positions can be used to reduce complexity.

Figure 4B:
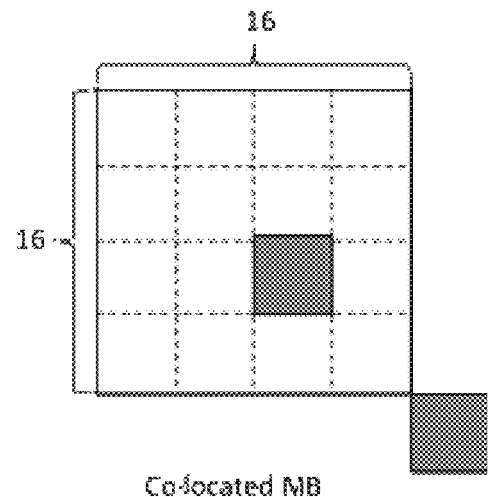
Figure 4C:
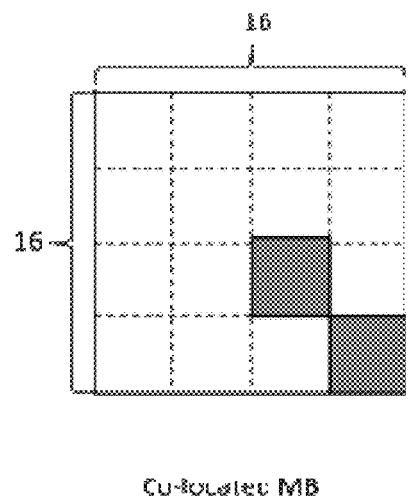
Figure 4D:
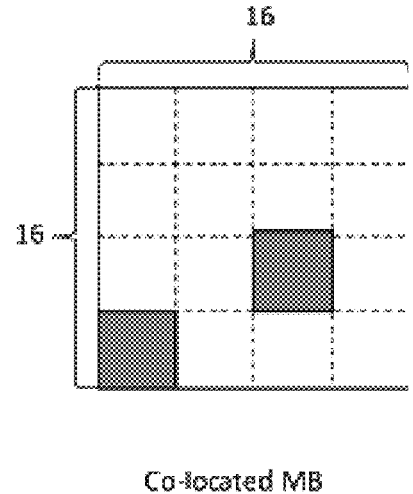
Figure 4E:
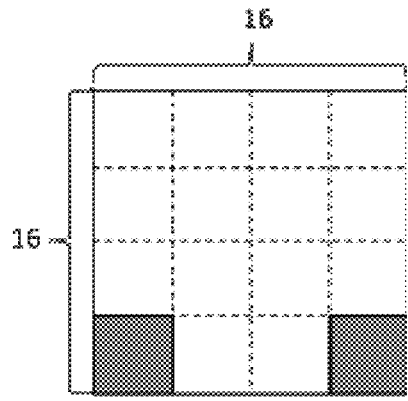
Figure 4F:
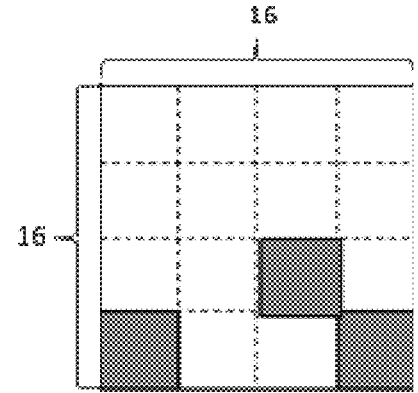
Figure 4G:
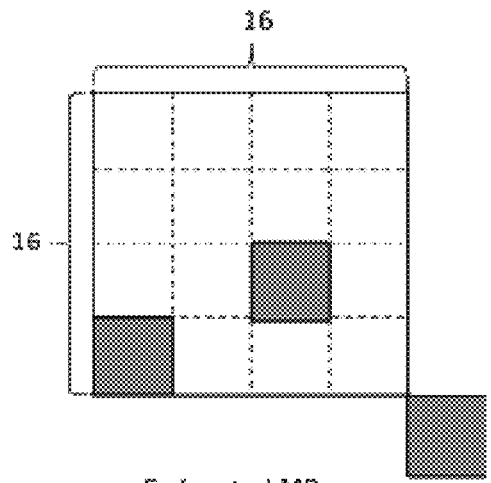
Figure 4H:
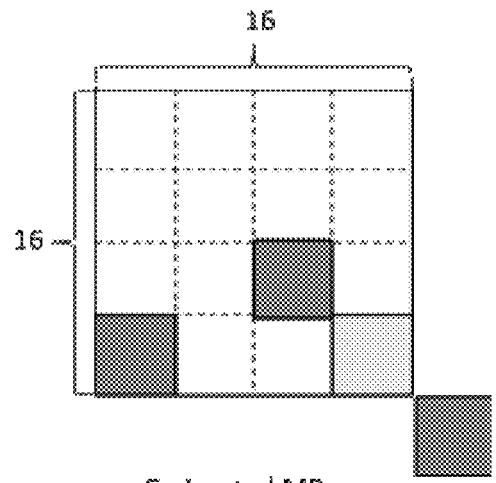

In FIG. 4B, only center and bottom right position outside the MB may be considered. In FIG. 4C, only center and bottom right corner position inside the MB may be considered. In FIG. 4D, only center and bottom left corner position inside the MB may be considered. In FIG. 4E, the bottom right corner position and the bottom left corner position inside the MB may be considered. In FIG. 4F, the center and the two corner positions in the bottom row may be considered. In FIG. 4G, the center, the bottom-left corner block inside, and the bottom-right block outside the MB can be considered.

In some examples, if one of the block candidates is not available (e.g. out of a picture boundary), the position is replaced with another position. For example, in FIG. 4H, if the bottom-right block position outside the MB is not available, the bottom-right corner position is checked.

In some examples, the positions may vary with a certain condition. For example, if there is a significant motion change between the current MB and the co-located MB, the positions may be accordingly changed with the motion. The checking order can be any permutated order of the block positions to be checked.

The above described examples for evaluating temporal blocks, the following describes implementations for evaluating spatial blocks. The examples indicate spatial blocks that the video coder checks to determine if any of these blocks are inter-view predicted with a disparity motion vector.

FIG. 5A-5D illustrate example block positions for the spatially neighboring macroblocks that are checked for disparity vector derivation. In a similar manner to the temporally co-located blocks, there are also pre-defined 4×4 spatially neighboring blocks for the currently coded MB. The block position A, B, C and D are checked to find out a disparity motion vector, as illustrated in FIGS. 5A-5D; however, other combinations and permutations may be possible.

Figure 5A:
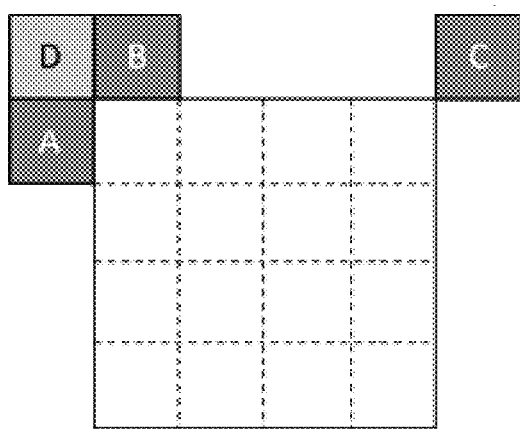
FIG. 5A-5D illustrate example block positions for the spatially neighboring macroblocks that are checked for disparity vector derivation.

In FIG. 5A, the block position A, B, and C are checked to find out a disparity motion vector. If the position C is not available (e.g. out of picture boundary), then the position D is considered. In some examples, any neighboring positions in all the rows and columns of the current MB can be considered on top of the position A, B, C, and D. In some examples, any selective positions in the rows and columns can be considered.

Figure 5B:
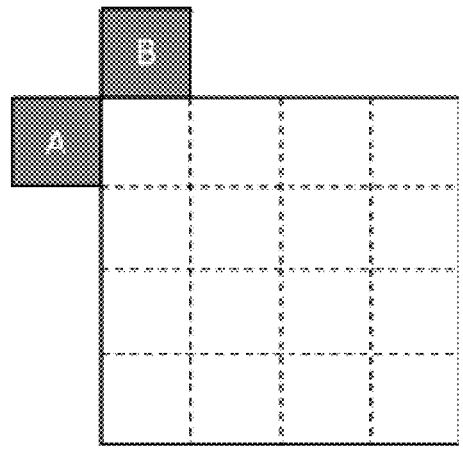
Figure 5C:
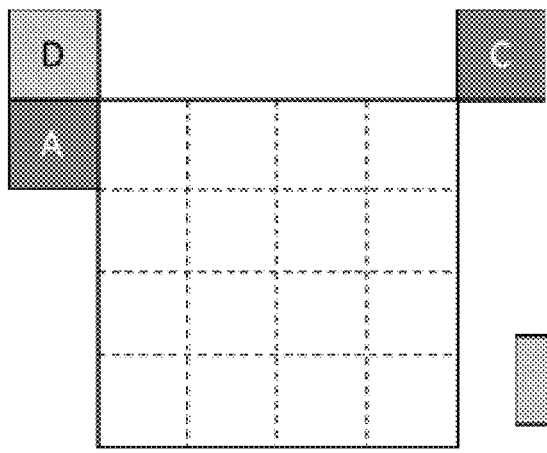
Figure 5D:
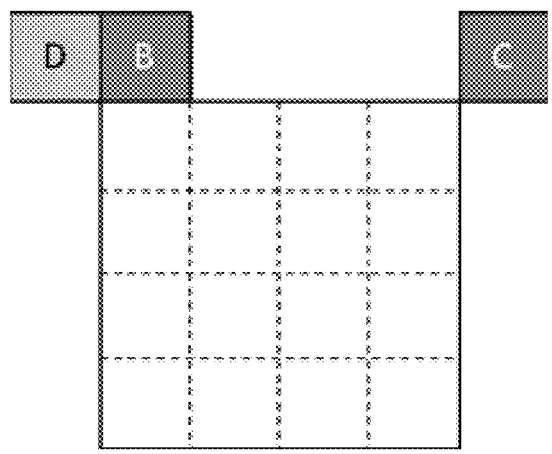

In FIG. 5B, block positions A and B may be considered. In FIG. 5C, the block positions A and C may be considered, and in some examples, the block position C may be replaced with D if the block at position C is not available. In FIG. 5D, the block positions in the above-row of the MB may be considered. In addition, any permuted order in the selected block positions can be applied in the search process.

The above described examples of spatial and temporal neighbors whose motion information is evaluate to determine if any of these neighboring block are inter-view predicted for disparity vector derivation in the NBDV (neighboring block based disparity vector) derivation techniques. The following describes examples of when the NBDV derivation technique is terminated (i.e., when the video coder stops evaluating motion information of neighboring block for deriving the disparity vector).

In general, the video coder stops evaluating motion information once the video coder identifies a disparity motion vector. However, in some examples, the disparity motion vector with its horizontal component unequal to 0 may not be considered as the termination condition. In other words, even if a neighboring block is inter-view predicted with a disparity motion vector, if the horizontal component of the disparity motion vector is unequal to 0, the video coder may keep evaluating motion information of neighboring blocks.

In some examples, the termination condition may be when the video identifies a zero disparity motion vector. In some examples, the video may identify multiple disparity motion vector candidates, and then apply filtering so that one becomes the disparity vector. In some examples, if no disparity motion vector is found, the video coder uses a zero disparity vector for motion vector prediction or other coding tools dependent on disparity vectors.

The following describes implementation examples for motion vector prediction. For instance, the following provides detailed implementation on NBDV based motion vector prediction for normal inter modes as well as skip and direct modes. In this example, during both the D-MVP process and inter-view motion prediction for skip and direct modes, when a disparity motion vector is unavailable for a neighboring block, it is converted from the NBDV derivation result. During the D-MVP process for the temporal prediction, the disparity vector used to identify the reference block is set to be the NBDV result. The following uses underlining and italics to identify language deleted from earlier versions of 3D-AVC, and underlining and bolding to identify added language as a way to illustrate changes.

The following is pseudo-code for NBDV derivation with the D-MVP process in inter-view prediction.

J.8.3 3DVC Inter Prediction, Inter-View Prediction, View Synthesis Prediction and Adaptive Luminance Compensation

---

*The function Disparity( depthSample, srcIndex, refIndex ) is specified to return disparityValue specified as follows.*
   *disparityValue = ( NdrInverse[ depthSample ] ** 
   *DisparityScale[ dps_id ][ srcIndex ][ refIndex ] +*
   *( DisparityOffset[ dps_id ][ srcIndex ][ refIndex ] << BitDepthY ) +*
   *( 1 << ( log2Div − 1 ) ) ) >> log2Div*

---

J.8.3.1.8 Depth-Based Derivation Process for Median Luma Motion Vector Prediction When either partition mbAddrN\mbPartIdxN\subMbPartIdxN is not available or refIdxLXN is not equal to refIdxLX, mvLXN is derived as specified by the following ordered steps:

1. The inverse macroblock scanning process as specified in subclause 6.4.1 is invoked with CurrMbAddr as the input and the output is assigned to (x1, y1).
2. The inverse macroblock partition scanning process specified in subclause 6.4.2.1 is invoked with mbPartIdx as the input and the output assigned to (dx1, dy1).
3. The inverse sub-macro block partition scanning process specified in subclause 6.4.2.2 is invoked with mbPartIdx and subMbPartIdx as the input and the output assigned to (dx2, dy2).
4. The modification process of inter-view motion vector in median luma motion vector prediction as specified in subclause J.8.3.1.8.1 is invoked with depthPic being equal to DepthRefPicList0 [refIdxL0], dbx1 being equal to x1+dx1+dx2, dby1 being equal to y1+dy1+dy2, and mv being equal to mvL0 as inputs and the output is assigned to the motion vector mvLXN.

Each component of the motion vector prediction mvpLX is given by the median of the corresponding vector components of the motion vector mvLXA, mvLXB, and mvLXC:

mvpLX[0]=Median(mvLXA[0],mvLXB[0],mvLXC[0])  (J8-XX)

mvpLX[1]=Median(mvLXA[1],mvLXB[1],mvLXC[1])  (J8-XX)

J.8.3.1.8.1 Modification Process for InterView Motion Vector in Median Luma Motion Vector Prediction

---

*Let refViewId be the view_id value of depthPic.*
*The following ordered steps apply:*
*1. The variable maxDepth is specified as follows:*
    *maxDepth = INT_MIN*
    *for( j = 0; < partHeight; j += ( partHeight − 1 ) )*
    *for( i = 0; i < partWidth; i +=*
    *( partWidth − 1 ) )   (J-8-XX)*
        *if( depthPic [ dbx1 + i, dby1 + j ] > maxDepth )*
        *maxDepth = depthPic[ dbx1 + i, dby1 + j ]*
*2. The variable mv is specified as follows:*
    *srcIndex = ViewIdTo3DVAcquisitionParamIndex(*
    *view_id )*
    *refIndex = ViewIdTo3DVAcquisitionParamIndex(*
    *refViewId )*
    *mv[ 0 ] = Disparity( maxDepth, srcIndex, refIndex)*
    *mv[ 1 ] = 0*

---

Invoke the NBDV process as specified into the embodiment #1, and the outputted disparity vector tempDV is set to as follows:
mv[0]=tempDV[0]
mv[1]=0

The following is pseudo-code for NBDV with the D-MVP process in temporal prediction.

J.8.3 3DVC Inter Prediction, Inter-View Prediction, View Synthesis Prediction and Adaptive Luminance Compensation

---

*The function Disparity( depthSample, srcIndex, refIndex ) is specified to*
*return disparityValue specified as follows.*
    *disparityValue = ( NdrInverse[ depthSample ] ***
    *DisparityScale[ dps_id ][ srcIndex ][ refIndex ] +*
    *( DisparityOffset[ dps_id ][ srcIndex ][ refIndex ] <<*
    *BitDepthY ) +*
    *( 1 << ( log2Div − 1 ) ) ) >> log2Div*

---

J.8.3.1.9 Depth-Based Derivation Process for Median Luma Temporal Motion Vector Prediction When either partition mbAddrN\mbPartIdxN\subMbPartIdxN is not available or refIdxLXN is not equal to refIdxLX, mvLXN is derived as specified by the following ordered steps:

1. The inverse macroblock scanning process as specified in subclause 6.4.1 is invoked with CurrMbAddr as the input and the output is assigned to (x1, y1).

2. The inverse macroblock partition scanning process specified in subclause 6.4.2.1 is invoked with mbPartIdx as the input and the output assigned to (dx1, dy1).

3. The inverse sub-macro block partition scanning process specified in subclause 6.4.2.2 is invoked with mbPartIdx and subMbPartIdx as the input and the output assigned to (dx2, dy2).

4. The process specified in subclause J.8.3.1.9.1 is invoked with depthPic set to DepthCurrPic, dbx1 set to x1+dx1+dx2, dby1 set to y1+dy1+dy2 and listSuffixFlag as input and InterViewPic, an offset vector dy and an variable InterViewAvailable as outputs.

5. The refIdxCorrespond and mvCorrespond are set as follows.

J.8.3.1.9.1 Derivation Process for the Disparity Vector and the Inter-View Reference

---

*Inputs to this process are depth reference view component depthPic, th location of a*
*top-left sample ( dbx1, dby1 ) of a partition and the listSuffixFlag.*
*Outputs of this process are a picture InterViewPic, an offset vector dv and a variable*
*InterViewAvailable*
*The variable InterViewAvailable is set equal to 0.*
*The following applies to derive an inter-view reference picture or inter-view only*
*reference picture, InterViewPic, with X set to 1 when listFuffixFlag is 1 or 0 otherwise:*
    *for( cIdx = 0;cIdx<num_ref_idx_10_active_minus1 + 1 && !InterViewAvailable;*
    *cIdx ++)*
        *if ( view order index of RefPicList0[ cIdx ] is equal to 0) {*
        *InterViewPic = RefPicList0[ cIdx ]*
        *InterViewAvailable = 1*
        *}*
*When InterViewAvailable is equal to 1, the following steps apply in order.*
    *1. The variable maxDepth is specified as follows:*
        *maxDepth = INT_MIN*
        *for( j = 0; j < partHeight; j+=(partHeight−1) )*
        *for( i = 0; < partWidth; i+=(partWidth−1))*
        *if( depthPic[ dbx1 + i, dby1 + j ] > maxDepth ) maxDepth = depthPic[*
        *dbx1 + i, dby1 + j ]*
    *2. The variable dv is specified as follows:*

-continued

```
currIndex = ViewIdTo3DVAcquisitionParamIndex( view_id of the current view )
refIndex = ViewIdTo3DVAcquisitionParamIndex( view_id of the InterViewPic )
dv[ 0 ] = Disparity(maxDepth, currIndex, refIndex )
dv[ 1 ] = 0
```

Invoke the NBDV process as specified into the embodiment #1, and the outputted disparity vector tempDV is set to as follows:
dv[0]=tempDV[0]
dv[1]=0

The following is pseudo-code for NBDV with inter-view motion prediction.

J.8.3 3DVC Inter Prediction, Inter-View Prediction, View Synthesis Prediction and Adaptive Luminance Compensation

```
The function Disparity( depthSample, srcIndex, refIndex ) is specified to
return disparityValue specified as follows.
    disparityValue = ( NdrInverse[ depthSample ] *
    DisparityScale[ dps_id ][ srcIndex ][ refIndex ] +
    ( DisparityOffset[ dps_id ][ srcIndex ][ refIndex ] <<
    BitDepthY ) +
    ( 1 << ( log2Div − 1 ) ) ) >> log2Div
```

J.8.3.1.4 Derivation Process for the Disparity Vector and the Inter-View Reference If DvAvailable[0]+DvAvailable[1]+DvAvailable[2] is equal to 1, the following applies:

dv[0]=mvCand[i][0]
dv[1]=mvCand[i][1]

Otherwise, the following steps apply in order:

```
The variable maxDepth is specified as follows:
maxDepth = INT_MIN
for( j = 0; j < partHeight; j += ( partHeight − 1 ) )
for( i = 0; i < partWidth; i += ( partWidth − 1 ) )
if( depthPic[ dbx1 + i, dby1 + j ] > maxDepth )
    maxDepth = depthPic [ dbx1 + i, dby1 + j ]
The variable dispVector is specified as follows:
currIndex = ViewIdTo3DVAcquisitionParamIndex( view_id of
the current view )
refIndex = ViewIdTo3DVAcquisitionParamIndex( view_id of the
InterViewPic )
```

-continued

```
dispVector[ 0 ] = Disparity( maxDepth, currIndex, refIndex )
dispVector[ 1 ] = 0
```

Invoke the NBDV process as specified in the embodiment #1, and the outputted disparity vector tempDV is set to as follows:
dispVector[0]=tempDV[0]
dispVector[1]=0

The following provides another example of detailed implementation of NBDV based motion vector prediction when the disparity vector derived from the NBDV is directly used for inter-view prediction and/or the direct and skip mode. In this implementation, the disparity vector is converted from the disparity vector from the NBDV, and the median filtering is skipped. Instead, the disparity motion vector becomes the motion vector prediction.

The following provides pseudo-code for direct use of NBDV for D-MVP in inter-view prediction.

J.8.3.1.8 Depth-Based Derivation Process for Median Luma Motion Vector Prediction

```
When either partition mbAddrN\mbPartIdxN\subMbPartIdxN is not available or
refIdxLXN is not equal to refIdxLX, mvLXN is derived as specified by the following
ordered steps:
    1.  The inverse macroblock scanning process as specified in subclause 6.4.1is
        invoked with CurrMbAddr as the input and the output is assigned to ( x1, y1 ).
    2.  The inverse macroblock partition scanning process specified in subclause
        6.4.2.1 is invoked with mbPartIdx as the input and the output assigned to ( dx1,
        dy1 ).
    3.  The inverse sub-macroblock partition scanning process specified in subclause
        6.4.2.2 is invoked with mbPartIdx and subMbPartIdx as the input and the output
        assigned to ( dx2, dy2 ).
    4.  The modification process of inter-view motion vector in median luma motion
        vector prediction as specified in subclause J.8.3.1.8.1 is invoked with depthPic
        being equal to DepthRefPicList0[ refIdxL0 ], dbx1 being equal to x1 + dx1 +
        dx2, dby1 being equal to y1 + dy1 + dy2, and mv being equal to mvL0 as inputs
        and the output is assigned to the motion vector mcLXN.
Each component of the motion vector prediction mvpLX is given by the median of the
corresponding vector components of the motion vector mvLXA, mvLXB, and mvLXC:
    mvpLX[ 0 ] = Median( mvLXA[ 0 ], mvLXB[ 0 ], mvLXC[ 0 ] )    (J8-XX)
    mvpLX[ 1 ] = Median( mvLXA[ 1 ], mvLVB[ 1 ], mvLXC[ 1 ] )    (J8-XX)
```

Invoke the NBDV process as specified in the embodiment #1, and store the disparity vector to tempDV.

mvpLX[0]=tempDV[0]

mvpLX[1]=tempDV[1].

The following provides pseudo-code for direct use of NBDV for the inter-view motion vector prediction in skip/direct modes.

J.8.3.1.4 Derivation Process for the Disparity Vector and the Inter-View Reference

```
Set InterViewAvailable equal to 0.
The following applies to derive an inter-view reference picture or inter-view only
reference picture InterViewPic:
    for( cIdx = 0;cIdx<=num_ref_idx_l0_active_minus1 && !InterViewAvailable;
    cIdx ++)
        if ( view order index of RefPicList0[ cIdx ] is equal to 0) {
        InterViewPic = RefPicList0[ cIdx ]
        InterviewAvailable = 1
        }
When InterViewAvailable is equal to 1, the following steps apply in order.
    The process specified in subclause 8.4.1.3.2 is invoked with mbPartIdx set equal
to 0, subMbPartIdx set equal to 0, currSubMbType set equal to "na", and listSuffixFlag
set equal to 0 as input and with reference indices refIdxCandL0[ i ] and the motion
vectors mvCandL0[ i ] as outputs with i equal to 0, 1, and 2 corresponding to
neighbouring partition A, B, and C, respectively.
    The process specified in subclause 8.4.1.3.2 is invoked with mbPartIdx set equal
to 0, subMbPartIdx set equal to 0, currSubMbType set equal to "na", and listSuffixFlag
set equal to 1 as input and with reference indices refIdxCandL1[ i ] and the motion
vectors mvCandL1[ i ] as outputs with i equal to 0, 1, and 2 corresponding to
neighbouring partition A, B, C, respectively.
    The variable dv is derived as specified by the following ordered steps:
    Set DvAvailable[ i ] and mvCand[ i ] with i equal to 0, 1, and 2 corresponding
    to neighbouring partitions A, B, and C, respectively, as follows
    for( i = 0; i < 3; i++ )
    if( view order index of RefPicList0[ refIdxCandL0[ i ] ] is equal to 0 ) {
    DvAvailable[ i ] = 1
    mvCand[ i ] = mvCandL0[ i ]
    } else if( view order index of RefPicList1[ refIdxCandL1[ i ] ] is equal to
    0 ) {
    DvAvailable[ i ] = 1
    mvCand[ i ] = mvCandL1[ i ]
    } else
    DvAvailable[ i ] = 0
    If DvAvailable[ 0 ] + DvAvailable[ 1 ] + DvAvailable[ 2 ] is equal to 1, the
    following applies:
    dv[ 0 ] = mvCand[ i ][ 0 ]
    dv[ 1 ] = mvCand[ i ][ 1 ]
    Otherwise, the following steps apply in order:
    The variable maxDepth is specified as follows:
    maxDepth = INT_MIN
    for( j = 0; j < partHeight; j += ( partHeight − 1 ) )
    for( i = 0; i < partWidth; i += ( partWidth − 1 ) )
    if( depthPic[ dbx1 + i, dby1 + j ] > maxDepth )
    maxDepth = depthPic[ dbx1 + i, dby1 + j ]
    The variable dispVector is specified as follows:
    currIndex = ViewIdTo3DVAcquistionParamIndex( view_id of the current
    view )
    refIndex = ViewIdTo3DVAcquisitionParamIndex( view_id of the
    InterViewPic )
    dispVector[ 0 ] = Disparity( maxDepth, currIndex, refIndex )
    dispVector[ 1 ] = 0
    For each value of i equal to 0, 1, and 2, when DvAvailable[ i ] is equal to 0,
    mvCand[ i ] is set to dispVector.
    Each component of the variable dv is derived as follows:
    dv[ 0 ] = Median( mvCand[ 0 ][ 0 ], mvCand[ 1 ][ 0 ], mvCand[ 2 ][ 0 ] )
    dv[ 1 ] = Median( mvCand[ 0 ][ 1 ], mvCand[ 1 ][ 1 ], mvCand[ 2 ][ 1 ] )
```

Invoke the NBDV process as specified in the embodiment #1, and store the disparity vector to tempDV.

dv[0]=tempDV[0]
dv[1]=tempDV[1].

As described above, in some example, the video coder may invoke the NBDV process once for a macroblock, and all the partitions share the same results. In some examples, the video coder may invoke the NBDV process in the MB partition-level.

Figure 6A:
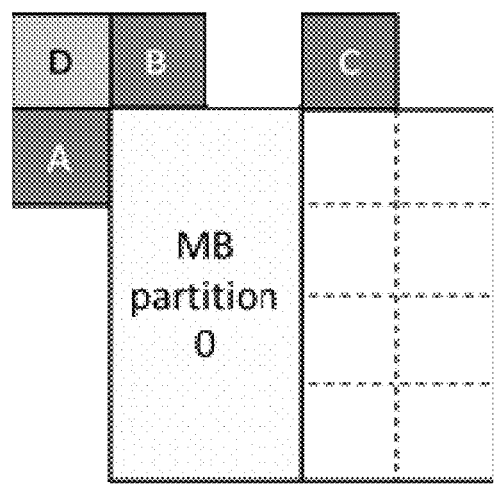
FIGS. 6A and 6B illustrate example block positions of neighboring blocks for macroblock partitions that are checked for disparity vector derivation.
Figure 6B:
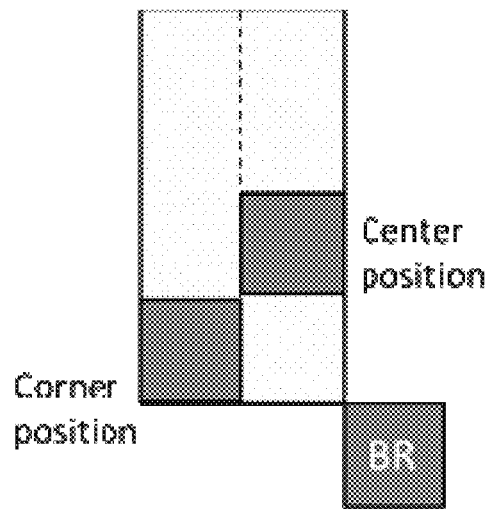

FIGS. 6A and 6B illustrate example block positions of neighboring blocks for macroblock partitions that are checked for disparity vector derivation when the partition is 8×16. In particular, FIG. 6A illustrates spatial neighboring blocks in MB-partition based NBDV derivation, and FIG. 6B illustrates temporal neighboring blocks in MB-partition based NBDV derivation.

In some examples, the temporal blocks follow the positions of the MB-based NBDV derivation. In some examples, the spatial blocks following the positions of the MB-based NBDV derivation. In some examples, the NBDV derivation process may be invoked in sub-MB partition or even in 4×4 block level, and the block positions may be changed accordingly.

In the D-MVP (i.e., in motion vector prediction), the video coder may invoke the motion vector prediction in sub-MB partition level or the MB-partition level. As one example, the video coder may invoke the MB-partition based NBDV derivation in every D-MVP process in the MB partition or in the sub-MB partition. As another example, the video coder may invoke in every D-MVP process in the MB partition or in the sub-MB partition.

The above described examples of derivation of temporal pictures, an example of NBDV and motion prediction, an example of NBDV derivation with the D-MVP process in inter-view prediction, an example of NBDV derivation with the D-MVP process in temporal prediction, and NBDV derivation with the inter-view motion prediction. The following provide some additional examples of such techniques. These examples are in addition to or instead of the techniques for deriving the temporal pictures described above. In other words, the following techniques may be used separately or in conjunction with any of the examples described above.

The following is a first additional example for derivation of temporal pictures. In some examples, a temporal picture is a picture which does not belong to the same access unit as the current picture. If a current picture is a P slice, only one temporal picture is derived to be RefPicList0[0]. If a current picture is a B slice, two temporal pictures are derived, in order as: RefPicList1[0] and RefPicList0[0].

In some examples, the following alternative derivation processes may apply. If a current picture has a temporal_id equal to 0, only one temporal picture is derived to be RefPicList0 [0]. Alternatively, the temporal picture in this case can be RefPicList1[0] if available, and RefPicList0[0] if RefPicList1[0] is unavailable. If a current picture has a temporal_id larger than 0, two temporal pictures are derived, in order as: RefPicList1[0] if available and RefPicList0[0] if available.

In some examples, the following alternative derivation processes may apply. If a current picture has an anchor picture, only one temporal picture is derived to be RefPicList0[0]. Alternatively, the temporal picture in this case can be RefPicList1[0] if available, and RefPicList0[0] if RefPicList1[0] is unavailable. If a current picture has a non-anchor picture, two temporal pictures are derived, in order as: RefPicList1[0] if available and RefPicList0[0] if available.

The following is a second additional example for derivation of temporal pictures. The techniques of second additional example for derivation of temporal pictures may be similar to the first example for derivation of temporal pictures. However, if a current picture belongs to an anchor picture, no temporal picture is derived and the NBDV derivation process may not check the temporal neighboring blocks (e.g., the NBDV process always doesn't check the temporal neighboring blocks).

The following describes an additional example for NBDV derivation and motion prediction. This example technique may be similar to the example described above for NBDV derivation in 3D-AVC. However, one of the two alternatives apply, assuming the output of the NBDV process is a disparity vector (DV), which is set by a disparity motion vector (DMV) of a block:

DV[1] is set to 0;
DV[1] is set to DMV[1].

Here, it is assumed the NBDV derivation process has been invoked for the whole MB. Also, similar to as described above with motion vector prediction based on NBDV, the DV is used to replace the disparity vector converted from depth, and it is further used in the same way of various inter prediction modes.

The following is pseudo-code for another example of NBDV derivation with the D-MVP process in inter-view prediction.

J.8.3 3DVC Inter Prediction, Inter-View Prediction, View Synthesis Prediction and Adaptive Luminance Compensation The same as described above with respect to first example of NBDV with the D-MVP process in inter-view prediction.

J.8.3.1.8.1 Modification Process for Inter View Motion Vector in Median Luma Motion Vector Prediction

---

*Let refViewId be the view_id value of depthPic.*
*The following ordered steps apply:*
  *3. The variable maxDepth is specified as follows:*
     *maxDepth = INT_MIN*
     *for( j = 0; j < partHeight; j += ( partHeight − 1 ) )*
     *for( i = 0; i < partWidth; i += ( partWidth − 1 ) ) (J-8-XX)*
     *if( depthPic[ dbx1 + i, dby1 + j ] > maxDepth )*
     *maxDepth = depthPic[ dbx1 + i, dby1 + j ]*
  *4. The variable mv is specified as follows:*
     *srcIndex = ViewIdTo3DVAcquisitionParamIndex( view_id )*
     *refIndex = ViewTo3DVAcquisitionParamIndex( refViewId )*
     *mv[ 0 ] = Disparity( maxDepth, srcIndex, refIndex)*
     *mv[ 1 ] = 0*
*mv[0] = DV[ 0 ]*
*mv[1] = DV[ 1 ]*

---

The following is pseudo-code for another example of NBDV with the D-MVP process in temporal prediction.

J.8.3 3DVC Inter Prediction, Inter-View Prediction, View Synthesis Prediction and Adaptive Luminance Compensation The same as described in the first example of NBDV with the D-MVP process in temporal prediction.

J.8.3.1.9 Depth-Based Derivation Process for Median Luma Temporal Motion Vector Prediction The same as described in the first example of NBDV with the D-MVP process in temporal prediction.

J.8.3.1.9.1 Derivation Process for the Disparity Vector and the Inter-View Reference

---

*Inputs to this process are depth reference view component depthPic, the location of a top-left sample ( dbx1, dby1 ) of a partition and the listSuffixFlag.*
*Outputs of this process are a picture InterViewPic, and offset vector dx and a variable InterViewAvailable*
*The variable InterViewAvailable is set equal to 0.*
*The following applies to derive an inter-view reference picture or inter-view only reference picture, InterViewPic, with X set to 1 when listSuffixFlag is 1 or 0 otherwise:*
  *for( cIdx = 0;cIdx<num_ref_idx_10_active_minus1 + 1 && !interViewAvailable;*
     *cIdx ++)*
         *if ( view order index of RefPicList0[ cIdx ] is equal to 0) {*
         *InterViewPic = RefPicList0[ cIdx ]*
         *InterViewAvailable = 1*
         *}*
*When InterViewAvailable is equal to 1, the following steps apply in order.*
  *1. The variable maxDepth is specified as follows:*
     *maxDepth = INT_MIN*
     *for( j = 0; j < partHeight; j+=(partHeight−1) )*
     *for( i = 0; i < partWidth; i+=(partWidth−1))*
     *if( depthPic[ dbx1 + i, dby1 + j ] > maxDepth ) maxDepth = depthPic[ dbx1 + i, dby1 + j ]*
  *2. The variable dv is specified as follows:*

```
    currIndex = ViewIdTo3DVAcquisitionParamIndex( view_id of the current view )
    refIndex = ViewTo3DVAcquisitionParamIndex( view_id of the InterViewPic )
    dv[ 0 ] = Disparity(maxDepth, currIndex, refIndex )
    dv[ 1 ] = 0
dv[ 0 ] = DV[ 0 ]
dv[ 1 ] = DV[ 1 ]
```

The following is pseudo-code for an additional example for NBDV with the inter-view motion prediction.
J.8.3 3DVC Inter Prediction, Inter-View Prediction, View Synthesis Prediction and Adaptive Luminance Compensation
The same as described in the first example of NBDV with inter-view motion prediction described above.
J.8.3.1.4 Derivation Process for the Disparity Vector and the Inter-View Reference
  If  DvAvailable[0]+DvAvailable[1]+DvAvailable[2]  is equal to 1, the following applies:
    dv[0]=mvCand[i][0]
    dv[1]=mvCand[i][1]
  Otherwise, the following steps apply in order:

```
The variable maxDepth is specified as follows:
maxDepth = INT_MIN
for( j = 0; j < partHeight; j += ( partHeight – 1 ) )
 for( i = 0; i < partWidth; i += ( partWidth – 1 ) )
  if( depthPic[ dbx1 + i, dby1 + j ] > maxDepth )
   maxDepth = depthPic[ dbx1 + i, dby1 + j ]
The variable dispVector is specified as follows:
currIndex = ViewIdTo3DVAcquistionParamIndex( view_id of
the current view )
refIndex = ViewIdTo3DVAcquistionParamIndex( view_id of the
InterViewPic )
dispVector[ 0 ] = Disparity( maxDepth, currIndex, refIndex )
dispVector[ 1 ] = 0
Set disp Vector as follows:
dispVector[ 0 ]= DV[0]
dispVector[ 1 ]= DV[1]
```

Figure 7:
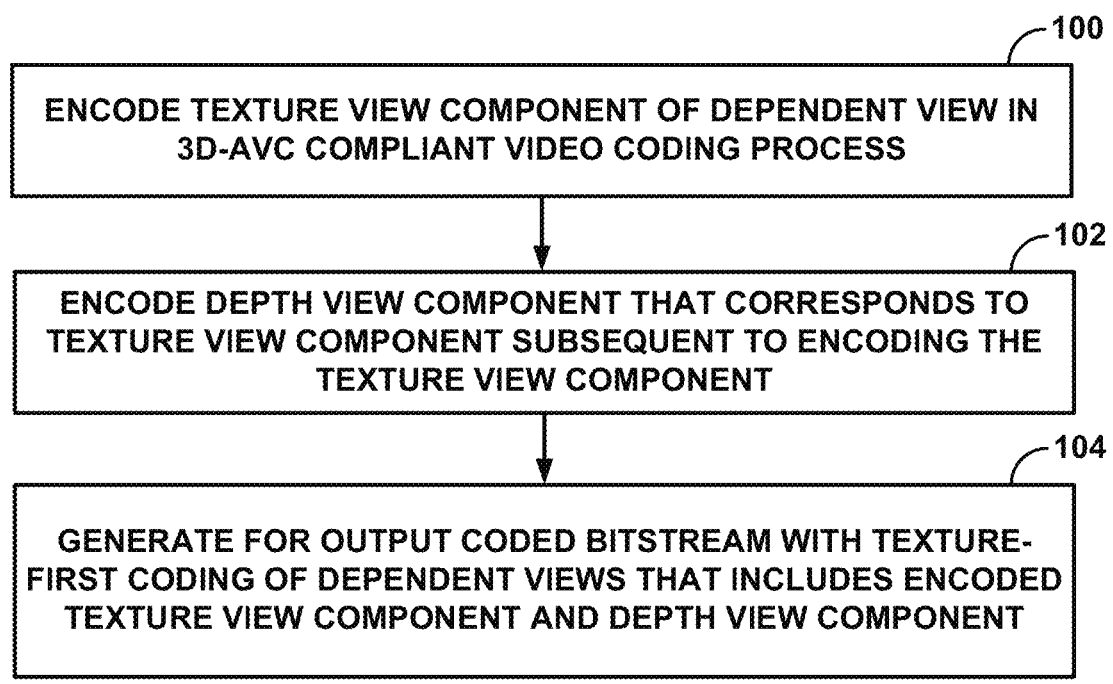
FIG. 7 is a flowchart illustrating an example operation of encoding in accordance with techniques described in this disclosure.

FIG. 7 is a flowchart illustrating an example operation of encoding in accordance with techniques described in this disclosure. Video data memory 40 may store base views and dependent views. One or more processors of video encoder 20 may encode, in a 3D-AVC compliant video coding process, a texture view component of a dependent view (100). The one or more processors of video encoder 20 may encode a depth view component that corresponds to the texture view component subsequent to encoding the texture view component (102). The techniques allow for the texture view component to be encoded before the depth view component because the disparity vector derivation for a block in the texture view component does not need the depth view component. The one or more processors of video encoder 20 may generate for output a coded bitstream with texture-first coding of dependent views that includes the encoded texture view component and the encoded depth view component.

Figure 8:
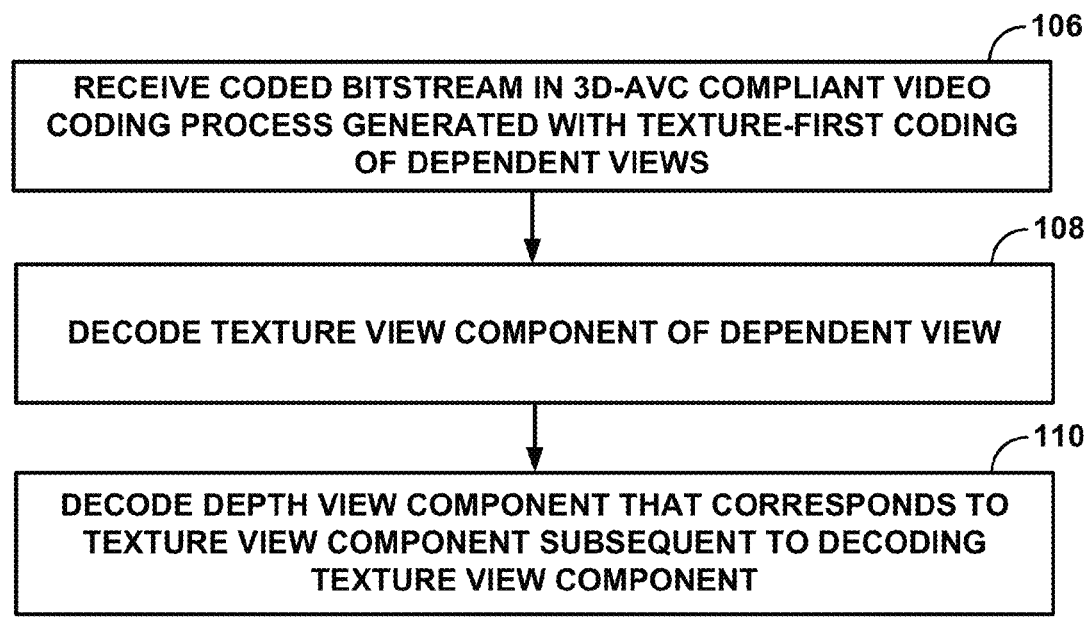
FIG. 8 is a flowchart illustrating an example operation of decoding in accordance with the techniques described in this disclosure.

FIG. 8 is a flowchart illustrating an example operation of decoding in accordance with the techniques described in this disclosure. One or more processors of video decoder 30 may receive a coded bitstream in 3D-AVC compliant video coding process generated with texture-first coding of dependent views (106). For instance, video data memory 69 may store information that the one or more processors of video decoder 30 uses for decoding 3D-AVC compliant video including base and dependent views that include texture view components and depth view components.

The one or more processors of video decoder 30 may decode a texture view component of a dependent view (108). The one or more processors of video decoder 30 may decode a depth view component that corresponds to the texture view component subsequent to decoding the texture view component (110).

Figure 9:
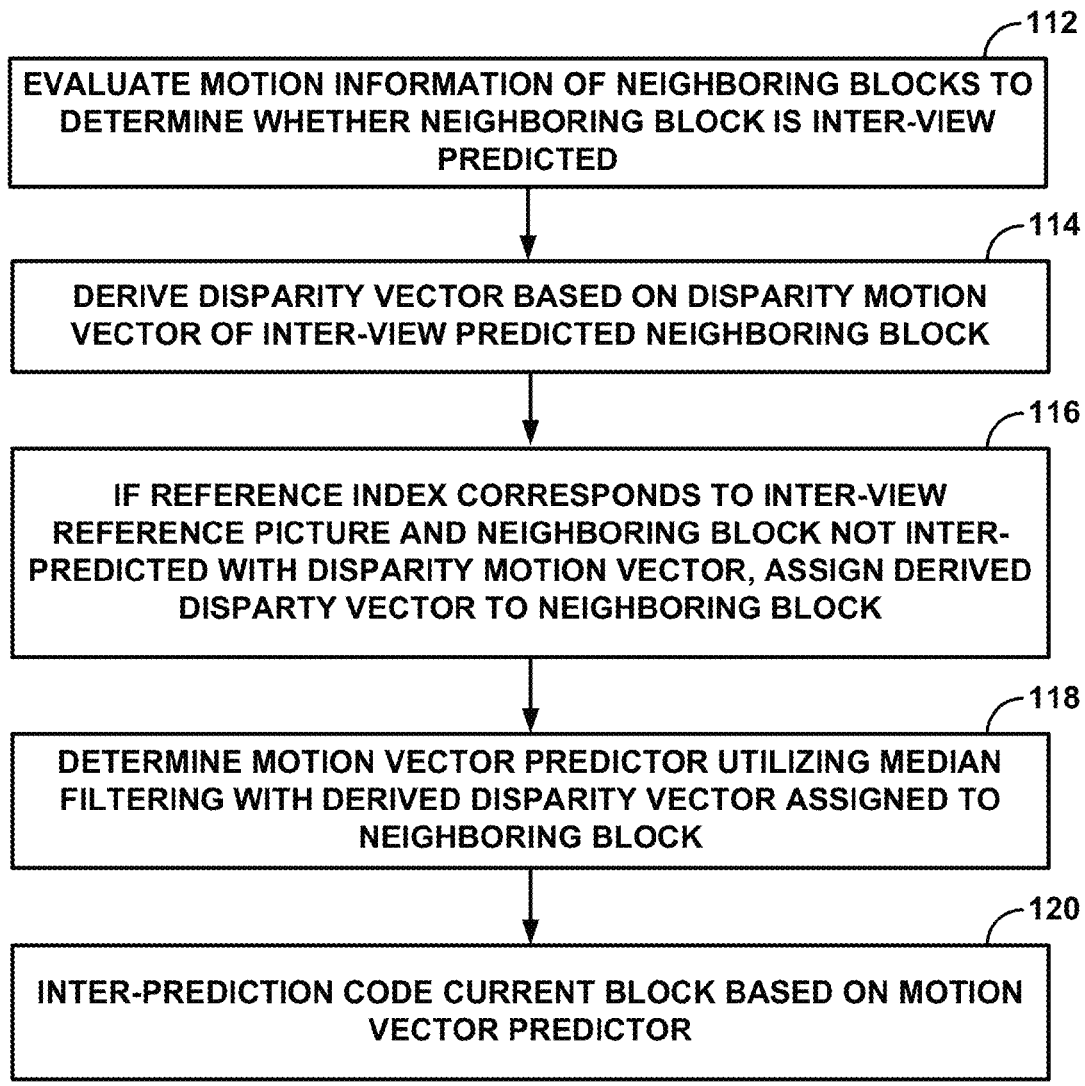
FIG. 9 is a flowchart illustrating an example operation of disparity vector derivation and inter-prediction coding in accordance with techniques described in this disclosure.

FIG. 9 is a flowchart illustrating an example operation of disparity vector derivation and inter-prediction coding in accordance with techniques described in this disclosure. For purposes of illustration the example illustrated in FIG. 9 is described with a video coder. One example of the video coder is video encoder 20 and another example of the video coder is video decoder 30. Accordingly, video encoder 20 and video decoder 30 may be configured to implement the example techniques described in FIG. 9.

As illustrated, the video coder may evaluate motion information of neighboring blocks to determine whether a neighboring block is inter-view predicted with a disparity motion vector that refers to an inter-view reference picture (112). The video coder may derive a disparity vector based on the disparity motion vector of the inter-view predicted neighboring block (114).

For example, the one or more neighboring blocks include a temporal neighboring block. This temporal neighboring block may be in a temporal picture of two temporal picture candidates. To determine the two temporal picture candidates, the video coder may select a first temporal picture and a second temporal picture, the first temporal picture and the second temporal picture may be pictures identified in the first entry of respective reference picture lists.

In some examples, the video coder may evaluate motion information of only neighboring blocks with motion vectors that refer to one of the two reference picture lists (e.g., refer to RefPicList0). If a motion vector for a neighboring block refers to the other reference picture list, then the video coder may not evaluate the motion information. In other words, the video coder may avoid the evaluating of motion information of neighboring blocks with motion vectors that refer to the other reference picture list (RefPicList1). In this way, even if there is a disparity motion vector, this disparity motion vector may not be used to derive the disparity vector for the current macroblock, if the disparity motion vector refers to RefPicList1 (i.e., an inter-view reference picture in RefPicList1).

In the techniques described in this disclosure for inter-view motion vector prediction for normal inter-prediction mode, if the reference index corresponds to an inter-view reference picture and a neighboring block that is used for motion vector prediction is not inter-predicted with a disparity motion vector, the video coder may assign the derived disparity vector to the neighboring block that is not inter-view predicted (116). The video coder may be able to determine if the current block is to be inter-view predicted if the reference index into the reference picture list identifies an inter-view reference picture.

In the example illustrated in FIG. 9, the video coder may determine a motion vector predictor utilizing median filtering, where the median filtering utilizes the disparity vector assigned as a disparity motion vector to the neighboring block that is not inter-view predicted (118). The video coder may inter-prediction code the current block based on the motion vector predictor (120). For example, the video coder may determine the motion vector for the current block based on the motion vector predictor and a difference between the motion vector predictor and the actual motion vector for the current block. The video coder may then identify the predictor block from the motion vector for the current block used for inter-prediction coding.

Figure 10:
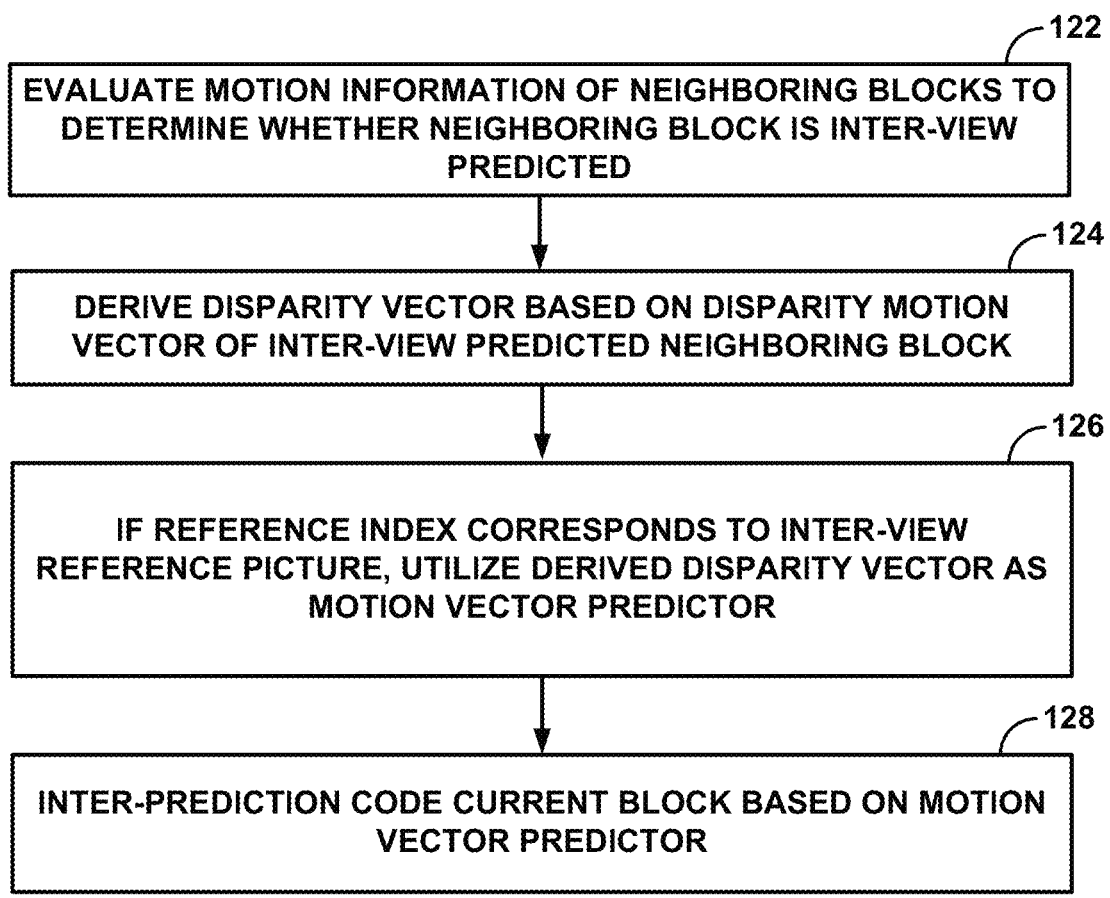
FIG. 10 is a flowchart illustrating another example operation of disparity vector derivation and inter-prediction coding in accordance with techniques described in this disclosure.

FIG. 10 is a flowchart illustrating another example operation of disparity vector derivation and inter-prediction coding in accordance with techniques described in this disclosure. For purposes of illustration the example illustrated in FIG. 10 is described with a video coder. One example of the video coder is video encoder 20 and another example of the video coder is video decoder 30. Accordingly, video encoder 20 and video decoder 30 may be configured to implement the example techniques described in FIG. 10.

As illustrated in FIG. 10, the video coder may evaluate motion information of neighboring block to determine whether neighboring block is inter-view predicted (122) and derive a disparity vector based on the disparity motion vector of inter-view predicted neighboring block (124), similar to the above description with respect to FIG. 9. In the example in FIG. 10, if the reference index corresponds to inter-view reference picture, the video coder utilizes the derived disparity vector as a motion vector predictor (126). In this example, the video coder may not need to use median filtering to determine the motion vector predictor. The video coder may inter-prediction code the current block based on the motion vector predictor, similar to inter-prediction coding described above with respect to FIG. 9 (128).

It is to be recognized that depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently (e.g., through multi-threaded processing, interrupt processing, or multiple processors, rather than sequentially).

Those of skill will recognize that the various illustrative logical blocks, modules, circuits, and algorithm steps described in connection with the methods, systems, and apparatuses disclosed herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Moreover, examples disclosed herein may be implemented or performed with an electronic device or circuit such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method of decoding video data for 3D-Advanced Video Coding (3D-AVC) comprising:

receiving a coded bitstream in a 3D-AVC compliant video coding process generated with texture-first coding of dependent views;

decoding a texture view component of a dependent view of the dependent views in the 3D-AVC compliant video coding process, wherein decoding the texture view component comprises:

evaluating motion information of one or more neighboring blocks of a current macroblock in the texture view component to determine whether at least one neighboring block of the current macroblock is inter-view predicted with a disparity motion vector that refers to an inter-view reference picture in a view other than the dependent view, wherein evaluating the motion information of the one or more neighboring blocks of the current macroblock comprises:

prior to evaluating one or more spatial neighboring blocks of the current macroblock, evaluating one or more temporal neighboring blocks of the current macroblock in only up to two temporal pictures to determine whether at least one temporal neighboring block of the current macroblock is inter-view predicted with the disparity motion vector, wherein the at least one temporal neighboring block is in one of the two temporal pictures, wherein the two temporal pictures comprise a first temporal picture and a second temporal picture, wherein the first temporal picture comprises a picture identified at a first entry of a first reference picture list, and wherein the second temporal picture comprises a picture identified at a first entry of a second reference picture list;

deriving a disparity vector for the current macroblock based on the disparity motion vector for one of the evaluated neighboring blocks; and assigning the derived disparity vector to each block within the current macroblock; and decoding a depth view component that corresponds to the texture view component subsequent to decoding the texture view component.

2. The method of claim 1, further comprising:
implementing one or more coding tools utilizing the derived disparity vector without using the depth view component for deriving the disparity vector.

3. The method of claim 1, wherein evaluating motion information comprises:
evaluating motion information of only the one or more neighboring blocks, of the current macroblock, with motion vectors that refer to the first reference picture list of two reference picture lists to determine whether the at least one neighboring block of the current macroblock is inter-view predicted with the disparity motion vector; and
avoiding the evaluation of motion information of the one or more neighboring blocks, of the current macroblock, with motion vectors that refer to the second reference picture list of the two reference picture lists to determine whether at least one neighboring block of the current macroblock is inter-view predicted with the disparity motion vector.

4. The method of claim 1, wherein evaluating one or more temporal neighboring blocks comprises:
evaluating motion information for only one bottom-right block in at least one of the first temporal picture or the second temporal picture, wherein the bottom-right block comprises a block located at a position bottom and to right of the current macroblock and in the at least one of the first temporal picture or the second temporal picture.

5. The method of claim 1, wherein evaluating motion information further comprises:
evaluating motion information of up to a maximum of four spatial neighboring blocks after evaluating one or more temporal neighboring blocks.

6. The method of claim 5, wherein three of the four spatial neighboring blocks comprise the same neighboring blocks used for motion prediction in the H.264/AVC video coding standard.

7. The method of claim 5, wherein the four spatial neighboring blocks comprise:
a block located left of the current macroblock, a block located above the current macroblock, a block located above-left of the current macroblock, and a block located above-right of the current macroblock.

8. The method of claim 1, wherein deriving a disparity vector comprises:
setting a horizontal component of the disparity vector equal to a horizontal component of the disparity motion vector; and
setting a vertical component of the disparity vector equal to zero.

9. A method of encoding video data for 3D-Advanced Video Coding (3D-AVC) comprising:
encoding a texture view component of a dependent view in a 3D-AVC compliant video coding process, wherein encoding the texture view component comprises:
evaluating motion information of one or more neighboring blocks of a current macroblock in the texture view component to determine whether at least one neighboring block of the current macroblock is inter-view predicted with a disparity motion vector that refers to an inter-view reference picture in a view other than the dependent view,
wherein evaluating the motion information of the one or more neighboring blocks of the current macroblock comprises:
prior to evaluating one or more spatial neighboring blocks of the current macroblock, evaluating one or more temporal neighboring blocks of the current macroblock in only up to two temporal pictures to determine whether at least one temporal neighboring block of the current macroblock is inter-view predicted with the disparity motion vector, wherein the at least one temporal neighboring block is in one of the two temporal pictures, wherein the two temporal pictures comprise a first temporal picture and a second temporal picture, wherein the first temporal picture comprises a picture identified at a first entry of a first reference picture list, and wherein the second temporal picture comprises a picture identified at a first entry of a second reference picture list;
deriving a disparity vector for the current macroblock based on the disparity motion vector for one of the evaluated neighboring blocks; and
assigning the derived disparity vector to each block within the current macroblock;
encoding a depth view component that corresponds to the texture view component subsequent to encoding the texture view component; and
generating for output a coded bitstream with texture-first coding of dependent views that includes the encoded texture view component and the encoded depth view component.

10. The method of claim 9, further comprising:
implementing one or more coding tools utilizing the derived disparity vector without using the depth view component for deriving the disparity vector.

11. The method of claim 9, wherein evaluating motion information comprises:
evaluating motion information of only the one or more neighboring blocks of the current macroblock with motion vectors that refer to the first reference picture list of two reference picture lists to determine whether at least one neighboring block of the current macroblock is inter-view predicted with the disparity motion vector; and
avoiding the evaluation of motion information of the one or more neighboring blocks of the current macroblock with motion vectors that refer to the second reference picture list of the two reference picture lists to determine whether at least one neighboring block of the current macroblock is inter-view predicted with the disparity motion vector.

12. The method of claim 9, wherein evaluating one or more temporal neighboring blocks comprises:
evaluating motion information for only one bottom-right block in at least one of the first temporal picture or the second temporal picture, wherein the bottom-right block comprises a block located at a position bottom and to right of the current macroblock and in the at least one of the first temporal picture or the second temporal picture.

13. The method of claim 9, wherein evaluating motion information comprises:
   evaluating motion information of up to a maximum of four spatial neighboring blocks after evaluating one or more temporal neighboring blocks.

14. The method of claim 13, wherein three of the four spatial neighboring blocks comprise the same neighboring blocks used for motion prediction in the H.264/AVC video coding standard.

15. The method of claim 13, wherein the four spatial neighboring blocks comprise:
   a block located left of the current macroblock, a block located above the current macroblock, a block located above-left of the current macroblock, and a block located above-right of the current macroblock.

16. The method of claim 9, wherein deriving a disparity vector comprises:
   setting a horizontal component of the disparity vector equal to a horizontal component of the disparity motion vector; and
   setting a vertical component of the disparity vector equal to zero.

17. A device for coding video data for 3D-Advanced Video Coding (3D-AVC) comprising:
   a memory configured to store video data; and
   a video coder, the video coder comprising one or more processors and configured to:
   code, in a 3D-AVC compliant video coding process, a texture view component of a dependent view of the video data, wherein, to code the texture view component, the video coder is configured to:
      evaluate motion information of only one or more neighboring blocks, of a current macroblock block in the texture view component, with motion vectors that refer to a first reference picture list of two reference picture lists and avoid evaluating motion information of neighboring blocks of the current macroblock with motion vectors that refer to a second reference picture list of the two reference picture lists to determine whether at least one neighboring block is inter-view predicted with a disparity motion vector that refers to an inter-view reference picture in a view other than the dependent view; and
      derive a disparity vector for the current macroblock based on the disparity motion vector for one of the evaluated neighboring blocks;
      assign the derived disparity vector to each block within the current macroblock; and
   code a depth view component, of the video data, that corresponds to the texture view component subsequent to coding the texture view component.

18. The device of claim 17, wherein the video coder comprises a video decoder, and wherein the video decoder is configured to receive a coded bitstream in the 3D-AVC compliant video coding process generated with texture-first coding of dependent views from which the video decoder decodes the texture view component and decodes the depth view component that corresponds to the texture view component.

19. The device of claim 17, wherein the video coder comprises a video encoder, and wherein the video encoder is configured to generate for output a coded bitstream with texture-first coding of dependent views that includes the texture view component encoded by the video encoder and includes the depth view component encoded by the video encoder.

20. The device of claim 17, wherein to code the texture view component, the video coder is configured to:
   select a first temporal picture, wherein the first temporal picture comprises a picture identified at a first entry of the first reference picture list; and
   select a second temporal picture, wherein the second temporal picture comprises a picture identified at a first entry of the second reference picture list,
   wherein, to evaluate motion information, the video coder is configured to evaluate motion information of at least one block in at least one of the first temporal picture or the second temporal picture based on a motion vector for the at least one block referring to the first reference picture list.

21. The device of claim 20, wherein, to evaluate motion information, the video coder is configured to:
   evaluate motion information for only one bottom-right block in at least one of the first selected temporal picture or the second selected temporal picture, wherein the bottom-right block comprises a block located at a position bottom and to right of the current macroblock and in the at least one of the first selected temporal picture or the second selected temporal picture.

22. The device of claim 17, wherein, to evaluate motion information, the video coder is configured to:
   evaluate motion information of up to a maximum of four spatial neighboring blocks.

23. The device of claim 22, wherein three of the four spatial neighboring blocks comprise the same neighboring blocks used for motion prediction in the H.264/AVC video coding standard.

24. The device of claim 22, wherein the four spatial neighboring blocks comprise:
   a block located left of the current macroblock, a block located above the current macroblock, a block located above-left of the current macroblock, and a block located above-right of the current macroblock.

25. The device of claim 17, wherein, to derive a disparity vector, the video coder is configured to:
   set a horizontal component of the disparity vector equal to a horizontal component of the disparity motion vector; and
   set a vertical component of the disparity vector equal to zero.

26. The device of claim 17, wherein the device comprises a wireless communication device.

27. A computer-readable storage medium having instructions stored thereon that when executed cause one or more processors of a video coder of a device for coding video data for 3D-Advanced Video Coding (3D-AVC) to:
   code a texture view component of a dependent view of the dependent views in the 3D-AVC compliant video coding process, wherein the instructions that cause the one or more processors to code the texture view component comprise instructions that cause the one or more processors to:
      evaluate motion information of only one or more neighboring blocks, of a current macroblock block in the texture view component, with motion vectors that refer to a first reference picture list of two reference picture lists and avoid evaluating motion information of neighboring blocks of the current macroblock with motion vectors that refer to a second reference picture list of the two reference picture lists to determine whether at least one neighboring block is inter-view predicted with a disparity motion vector that refers to an inter-view reference picture in a view other than the dependent view; and derive a disparity vector for the current macroblock based on the disparity motion vector for one of the evaluated neighboring blocks;

assign the derived disparity vector to each block within the current macroblock; and code a depth view component that corresponds to the texture view component subsequent to coding the texture view component.

28. The computer-readable storage medium of claim 27, further comprising instructions that cause the one or more processors to:

select a first temporal picture, wherein the first temporal picture comprises a picture identified at a first entry of the first reference picture list; and select a second temporal picture, wherein the second temporal picture comprises a picture identified at a first entry of the second reference picture list, wherein the instructions that cause the one or more processors to evaluate motion information comprise instructions that cause the one or more processors to evaluate motion information of at least one block in at least one of the first temporal picture or the second temporal picture based on a motion vector for the at least one block referring to the first reference picture list.

29. The computer-readable storage medium of claim 27, wherein the video coder comprises a video decoder, the storage medium further comprising instructions that cause the one or more processors of the video decoder to:

receive a coded bitstream in the 3D-AVC compliant video coding process generated with texture-first coding of dependent views from which the video decoder decodes the texture view component and decodes the depth view component that corresponds to the texture view component.

30. The computer-readable storage medium of claim 27, wherein the video coder comprises a video encoder, the storage medium further comprising instructions that cause the one or more processors of the video encoder to:

generate for output a coded bitstream with texture-first coding of dependent views that includes the texture view component encoded by the video encoder and includes the depth view component encoded by the video encoder.

* * * * *